(12) United States Patent
Nishi et al.

(10) Patent No.: US 10,134,438 B2
(45) Date of Patent: Nov. 20, 2018

(54) OPTICAL MEDIUM REPRODUCTION APPARATUS AND METHOD OF REPRODUCING OPTICAL MEDIUM

(71) Applicant: Sony Corporation, Tokyo (JP)

(72) Inventors: Noriaki Nishi, Kanagawa (JP); Kimihiro Saito, Kanagawa (JP); Junya Shiraishi, Nagano (JP); Takashi Nakao, Tokyo (JP); Kenji Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/900,322

(22) PCT Filed: Apr. 11, 2014

(86) PCT No.: PCT/JP2014/002080
§ 371 (c)(1),
(2) Date: Dec. 21, 2015

(87) PCT Pub. No.: WO2014/207972
PCT Pub. Date: Dec. 31, 2014

(65) Prior Publication Data
US 2016/0155468 A1 Jun. 2, 2016

(30) Foreign Application Priority Data
Jun. 28, 2013 (JP) .................................. 2013-135696

(51) Int. Cl.
*G11B 7/131* (2012.01)
*G11B 20/10* (2006.01)
(Continued)

(52) U.S. Cl.
CPC ........ *G11B 20/10212* (2013.01); *G11B 7/005* (2013.01); *G11B 7/0943* (2013.01);
(Continued)

(58) Field of Classification Search
None
See application file for complete search history.

(56) References Cited

U.S. PATENT DOCUMENTS 3,913,076 A 10/1975 Lehureau et al.
4,633,457 A 12/1986 Yamamoto
(Continued)

FOREIGN PATENT DOCUMENTS

CN 1287661 A 3/2001
CN 102446530 A 5/2012
(Continued)

OTHER PUBLICATIONS

[No Author Listed], Trial Production of Magneto Optical Disk Device Whose Storage Density is Doubled by Decreasing Track Pitch, Nikkei Electronics. 1990; 495:98-9.
(Continued)

*Primary Examiner* — Brian Butcher
(74) *Attorney, Agent, or Firm* — Wolf, Greenfield & Sacks, P.C.

(57) ABSTRACT

An optical medium reproduction apparatus for optically reproducing an optical medium, including: a detection unit for splitting a cross section of a beam returned from the optical medium into a plurality of regions and for forming respective detection signals; a multiple input adaptive equalizer having a plurality of adaptive equalizer units, wherein the respective detection signals are inputted into the adaptive equalizer units, and the outputs of the adaptive equalizer units are computed to form equalization signals; a binarization unit for binarizing the equalization signals to provide binary data; and an equalization error computing unit for determining an equalization error from equalization target signals provided based on the binary data from the binarization unit and the equalization signals, and providing the
(Continued)

adaptive equalizer units with the equalization error as control signals for adaptive equalization.

7 Claims, 22 Drawing Sheets

(51) Int. Cl.
| | | |
|---|---|---|
| *G11B 7/09* | | (2006.01) |
| *G11B 20/24* | | (2006.01) |
| *G11B 7/005* | | (2006.01) |
| *G11B 7/133* | | (2012.01) |
| *G11B 7/0037* | | (2006.01) |
| *G11B 7/007* | | (2006.01) |

(52) U.S. Cl.
CPC ........ *G11B 7/133* (2013.01); *G11B 20/10046* (2013.01); *G11B 20/10055* (2013.01); *G11B 20/24* (2013.01); *G11B 7/0037* (2013.01); *G11B 7/00718* (2013.01)

(56) References Cited

U.S. PATENT DOCUMENTS

| | | | |
|---|---|---|---|
| 5,347,504 | A | 9/1994 | Ito et al. |
| 5,386,410 | A | 1/1995 | Nagasaki et al. |
| 5,400,189 | A | 3/1995 | Sato et al. |
| 5,416,766 | A | 5/1995 | Horimai |
| 5,420,847 | A | 5/1995 | Maeda et al. |
| 5,508,990 | A | 4/1996 | Nagasaki et al. |
| 5,581,531 | A | 12/1996 | Ito et al. |
| 5,617,389 | A | 4/1997 | Satoh et al. |
| 5,621,717 | A | 4/1997 | Finkelstein et al. |
| 5,625,613 | A | 4/1997 | Kato et al. |
| 5,719,835 | A | 2/1998 | Ishika |
| 5,754,503 | A | 5/1998 | Senba et al. |
| 5,841,754 | A | 11/1998 | Lee et al. |
| 5,907,530 | A | 5/1999 | Cho et al. |
| 6,091,692 | A | 7/2000 | Morimoto |
| 6,483,650 | B1 * | 11/2002 | Imai .................. G11B 7/08517 359/814 |
| 6,577,568 | B1 | 6/2003 | Konishi et al. |
| 6,580,676 | B1 | 6/2003 | Yanagisawa et al. |
| 6,584,049 | B1 | 6/2003 | Ma et al. |
| 6,992,965 | B1 | 1/2006 | Glushko et al. |
| 7,826,323 | B2 | 11/2010 | Hayashi |
| 8,111,477 | B2 | 2/2012 | Nakagawa |
| 8,369,201 | B2 | 2/2013 | Saito et al. |
| 8,379,503 | B2 | 2/2013 | Yamatsu et al. |
| 8,416,656 | B2 | 4/2013 | Nishi |
| 8,582,402 | B2 | 11/2013 | Horigome |
| 8,685,517 | B2 | 4/2014 | Miki et al. |
| 8,867,324 | B2 | 10/2014 | Sekiguchi et al. |
| 8,929,190 | B2 | 1/2015 | Saito et al. |
| 9,111,555 | B2 | 8/2015 | Igari et al. |
| 9,672,859 | B2 | 6/2017 | Nishi et al. |
| 9,672,861 | B2 | 6/2017 | Takahashi et al. |
| 9,767,837 | B2 | 9/2017 | Nishi et al. |
| 2001/0038592 | A1 | 11/2001 | Kobayashi |
| 2002/0018420 | A1 | 2/2002 | Nishi |
| 2002/0027843 | A1 | 3/2002 | Kim et al. |
| 2002/0159378 | A1 | 10/2002 | Lee et al. |
| 2003/0016606 | A1 | 1/2003 | Urita et al. |
| 2003/0053393 | A1 | 3/2003 | Shimano et al. |
| 2005/0068864 | A1 | 3/2005 | Ma et al. |
| 2005/0199778 | A1 | 9/2005 | Kadowaki et al. |
| 2006/0104173 | A1 | 5/2006 | Shibuya et al. |
| 2006/0114791 | A1 | 6/2006 | Marshall et al. |
| 2006/0285461 | A1 | 12/2006 | Ashizaki et al. |
| 2007/0097834 | A1 | 5/2007 | Sakai |
| 2007/0286048 | A1 | 12/2007 | Hayashi |
| 2008/0056081 | A1 | 3/2008 | Otsuka et al. |
| 2008/0198730 | A1 | 8/2008 | Mori et al. |
| 2008/0239428 | A1 | 10/2008 | Bell et al. |
| 2009/0028021 | A1 | 1/2009 | Yin et al. |
| 2009/0238048 | A1 | 9/2009 | Feng et al. |
| 2009/0290473 | A1 | 11/2009 | Katayama |
| 2009/0303850 | A1 | 12/2009 | Nakai et al. |
| 2009/0316561 | A1 | 12/2009 | Nishimura et al. |
| 2010/0007984 | A1 | 1/2010 | Nakagawa |
| 2010/0157753 | A1 * | 6/2010 | Iwanaga ................ G11B 7/005 369/47.15 |
| 2011/0242951 | A1 | 10/2011 | Saito et al. |
| 2012/0008484 | A1 | 1/2012 | Yamatsu et al. |
| 2012/0082201 | A1 | 4/2012 | Shiraishi |
| 2012/0106308 | A1 | 5/2012 | Horigome |
| 2012/0163152 | A1 | 6/2012 | Hosaka et al. |
| 2012/0182851 | A1 | 7/2012 | Saito et al. |
| 2012/0294131 | A1 | 11/2012 | Nishi |
| 2013/0010583 | A1 | 1/2013 | Miyamoto et al. |
| 2013/0052389 | A1 | 2/2013 | Miki et al. |
| 2013/0235713 | A1 | 9/2013 | Suzuki |
| 2013/0322228 | A1 | 12/2013 | Saito et al. |
| 2014/0036651 | A1 | 2/2014 | Sekiguchi et al. |
| 2014/0044940 | A1 | 2/2014 | Ikuta et al. |
| 2014/0322476 | A1 | 10/2014 | Igari et al. |
| 2014/0341006 | A1 | 11/2014 | Miyashita et al. |
| 2016/0196848 | A1 | 7/2016 | Nishi et al. |
| 2016/0218808 | A1 | 7/2016 | Nishi et al. |
| 2016/0275983 | A1 | 9/2016 | Takahashi et al. |
| 2017/0117011 | A1 | 4/2017 | Nishi et al. |
| 2017/0133049 | A1 | 5/2017 | Nishi et al. |

FOREIGN PATENT DOCUMENTS

| | | |
|---|---|---|
| DE | 41 19 384 A1 | 12/1991 |
| EP | 0 375 342 A2 | 6/1990 |
| EP | 977183 A3 | 9/2001 |
| EP | 1 178 484 A2 | 2/2002 |
| EP | 2 437 262 A1 | 4/2012 |
| JP | 03-156729 A | 7/1991 |
| JP | 05-242512 A | 9/1993 |
| JP | 07-093757 A | 4/1995 |
| JP | 08-249664 A | 9/1996 |
| JP | 2000-048488 A | 2/2000 |
| JP | 2000-315322 A | 11/2000 |
| JP | 2001-034969 A | 2/2001 |
| JP | 2001-357545 A | 12/2001 |
| JP | 2003-223761 A | 8/2003 |
| JP | 4023365 B2 | 11/2004 |
| JP | 2005-332453 A | 12/2005 |
| JP | 2006-338782 A | 12/2006 |
| JP | 2007-058887 A | 3/2007 |
| JP | 2008-108325 A | 5/2008 |
| JP | 2010-225237 A | 10/2010 |
| JP | 2010-244672 A | 10/2010 |
| JP | 2012-079385 A | 4/2012 |
| WO | WO 2014/054246 A1 | 4/2014 |
| WO | WO 2014/057674 A1 | 4/2014 |

OTHER PUBLICATIONS

Chinese Office Action dated Dec. 21, 2017 in connection with CN 201480036737.7 and English translation thereof.

* cited by examiner

OPTICAL MEDIUM REPRODUCTION APPARATUS AND METHOD OF REPRODUCING OPTICAL MEDIUM

CROSS REFERENCE TO RELATED APPLICATIONS

This application claims the benefit under 35 U.S.C. § 371 as a U.S. National Stage Entry of International Application No. PCT/JP2014/002080, filed in the Japanese Patent Office as a Receiving Office on Apr. 11, 2014, which claims priority to Japanese Patent Application Number 2013-135696, filed in the Japanese Patent Office on Jun. 28, 2013, each of which is hereby incorporated by reference in its entirety.

TECHNICAL FIELD

The present invention relates to an optical medium reproduction apparatus for reproducing an optical medium such as an optical disc, and a method of reproducing an optical medium.

BACKGROUND ART

There are two methods for densifying an optical disc. On method is by shortening a channel bit length, i.e., a mark length, in a line density direction. The other method is by narrowing a track pitch. However, when the track pitch is narrowed, information leakage from adjacent tracks (adjacent track cross talk) is increased. There is proposed a method for decreasing the adjacent track cross talk (hereinafter simply referred to a cross talk, as appropriate).

For example, Patent Document 1 describes that a cross talk is cancelled by providing an adaptive equalizer unit with reproduction signals for a track to be reproduced and tracks at both sides of the track to be reproduced and by controlling a tap coefficient of the adaptive equalizer unit.

Patent Document 1: Japanese Patent Application Laid-open No. 2012-079385

SUMMARY OF INVENTION

Problem to be Solved by the Invention

An apparatus described in Patent Document 1 needs three beams for reading a track to be reproduced and tracks at both sides thereof at the same time. It is necessary to match phases of reproduction signals read by the three beams. It may be possible to sequentially reproduce the three tracks by one beam and to synchronize the reproduction signals. Note that a memory for synchronization is necessary. Accordingly, the apparatus described in Patent Document 1 is undesirable in that an optical pickup has a complicated structure, a phase matching becomes complex, and a circuit is enlarged.

An object of the present disclosure is to provide an optical medium reproduction apparatus and a method of reproducing an optical medium for canceling a cross talk by using a reproduction signal of one track to dissolve the above-described problems.

Means for Solving the Problem

In order to solve the above-described problems, the present disclosure provides an optical medium reproduction apparatus for optically reproducing an optical medium where a plurality of tracks are formed, including:

a detection unit for splitting a cross section of a beam returned from the optical medium into a plurality of regions and for forming respective detection signals of a plurality of the regions;

a multiple input adaptive equalizer having a plurality of adaptive equalizer units, wherein the respective detection signals of a plurality of the regions are inputted into the plurality of adaptive equalizer units, and the outputs of the plurality of adaptive equalizer units are computed to from equalization signals;

a binarization unit for binarizing the equalization signals to provide binary data; and an equalization error computing unit for determining an equalization error from equalization target signals provided based on the binary data from the binarization unit and the equalization signals outputted from the multiple input adaptive equalizer, and providing the adaptive equalizer units with the equalization error as control signals for adaptive equalization.

Effect of the Invention

According to the present disclosure, a cross talk can be cancelled by using only an output read from the track to be produced. It is unnecessary to use three beams for reading. In addition, it is unnecessary to sequentially reproduce three tracks with one beam and to synchronize by a memory. Advantageously, an optical pickup has no complicated structure, a phase matching is unnecessary, and a memory is not increased. In this way, an optical disc can be densified with a more simpler structure. Effects described herein are not limited only to be illustrative, there may be effects other than those described herein.

MODE(S) FOR CARRYING OUT THE INVENTION

The embodiments described below are merely depict preferable embodiments of the present disclosure, and technically preferable limitations are added thereto. However, the scope of the present disclosure should not be limited to the embodiments described later, so long as there is no description about the limitation of the present disclosure.

The embodiments will be described in the following order.
<1. Embodiment>
<2. Alternative Embodiment>
  <1.Embodiment>
[Optical Disc Apparatus]

Figure 1:
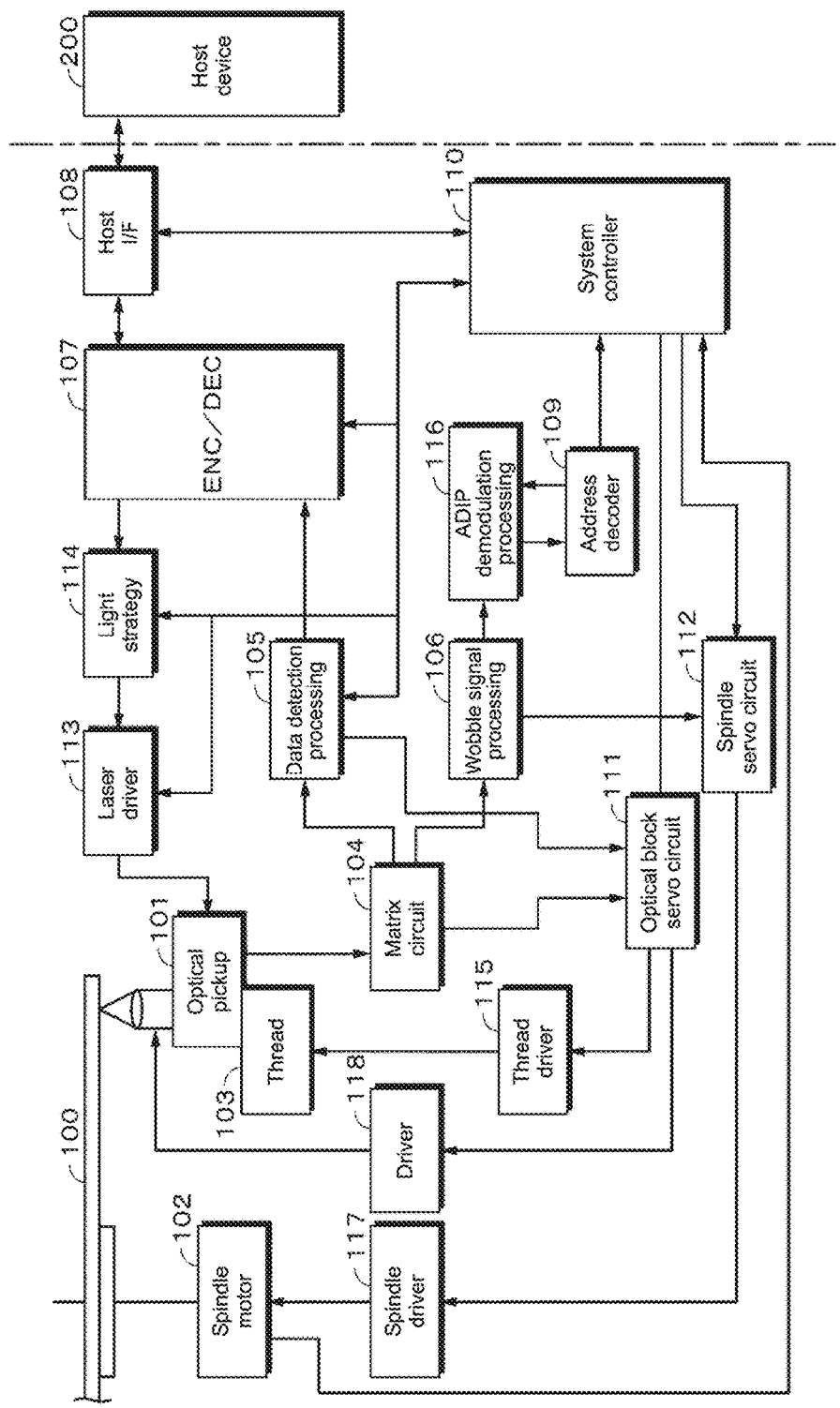
FIG. 1 A block diagram showing a structure of an optical disc apparatus according to one embodiment of the present disclosure.

An optical disc apparatus to which the present disclosure is applied includes an optical pickup 101 for recording and reproducing information on an optical disc 100 as the optical recording medium, and a spindle motor 102 for rotating the optical disc 100, as shown in FIG. 1. To move the optical pickup 101 in a radial direction of the optical disc 100, a thread 103 (feed motor) is disposed.

As the optical disc 100, a high density optical disc such as a BD (Blu-ray Disc™) can be used. The BD is a high density optical disc having a recording capacity of about 25G bytes on a single layer on one face and about 50G bytes on two layers on one face. According to a BD specification, a light source wavelength is 405 nm and a numerical aperture (NA) of a lens is as great as 0.85 in order to reduce a beam spot diameter. According to a CD specification, a light source wavelength is 780 nm, a NA is 0.45 and a spot diameter is 2.11 μm. According to a DVD specification, a light source wavelength is 650 nm, a NA is 0.6 and a spot diameter is 1.32 μm. According to the BD specification, the spot diameter can be as small as 0.58 μm.

In recent years, a BDXL™ having a great capacity of 100 GB on three layers and 128 GB on four layers by shortening a channel bit length, i.e., a mark length and by densifying in a line density direction is put to practical use over the BD (Blu-ray Disc™)

To further increase the recording capacity, an optical click utilizing a method of storing data both on a groove track and a land track (referred to as a land/groove recording method, as appropriate) is desirable. The groove track is a track formed by grooves. The grooves are defined as locations where are irradiated with laser light when the optical disc is produced. Areas sandwiched between adjacent grooves are referred to as lands. The land track is a track formed by the lands. In the case of a multilayer optical disk where a plurality of information recording layers are laminated, the recording capacity can be further increased.

When the optical disc 100 being capable of performing high density recording is loaded to the optical disc apparatus, the optical disc 100 is rotation-driven by the spindle motor 102 upon record/reproduction at a constant linear velocity (CLV) or a constant angular velocity (CAV). Upon reproduction, mark information recorded on the track of the optical disc 100 is read by the optical pickup (optical head) 101. Upon data record on the optical disc 100, user data is recorded as a phase change mark or a pigment change mark on the track of the optical disk 100 by the optical pickup 101.

In the case of a recordable disc, a recording mark by the phase change mark is recorded on the track formed by wobbling grooves. The phase change mark is recorded at a line density of 0.12 μm/bit, 0.08 μm/channel bit in the case of the BD having 23.3 GB per one layer by an RLL (1, 7) PP modulation method (RLL; Run Length Limited, PP: Parity preserve/Prohibit rmtr (repeated minimum transition run length)) or the like. Similarly, in the case of the BD having 25 GB/layer, recording is done at 0.0745 μm/bit. In the case of the BDXL™ having 32 GB/layer, recording is done at 0.05826 μm/bit. In the case of the BDXL™ having 33.4 GB/layer, recording is done at 0.05587 μm/bit. Depending on types of the discs, recording is performed at a density corresponding to the channel bit length. When a channel clock frequency is represented by "T", the mark length will be 2T to 8T. In the case of a read-only disc, no grooves are formed, data modulated by an RLL (1,7) PP modulation method is recorded as an emboss pit column.

At an inner periphery area of the optical disk 100, read-only management information such as physical information about the disk, is recorded by emboss pits or the wobbling grooves. The read-out of the information is also done by the optical pickup 101. In addition, ADIP information buried as wobbling of the groove track on the optical disk 100 by the optical pickup 101 is read out.

The optical pickup 101 includes a laser diode as a laser light source, a photodetector for detecting reflected light, an objective lens as an output terminal of the laser light, and an optical system for irradiating a disc recording surface with the laser light via the objective lens and leading the reflected light to the photodetector. Within the optical pickup 101, the objective lens is movably held by a biaxial mechanism in a tracking direction and a focus direction. A whole optical pickup 101 can be moved in a disc radial direction by a thread mechanism 103. To the laser diode of the optical pickup 101, a driving current is fed from the laser driver 113, whereby the laser diode generates laser.

The reflected light from the optical disk 100 is detected by the photodetector, is converted into an electrical signal corresponding to a received light intensity, and is fed to a matrix circuit 104. The matrix circuit 104 includes a current/voltage converter circuit and a matrix computing/amplifier circuit corresponding to an output current from a plurality of light receiving elements as the photodetector, and generates a necessary signal by matrix computing processing. Taking a signal transmission quality into consideration, the current/voltage converter circuit may be formed within a photodetector element. For example, it generates a reproduction information signal (RF signal) corresponding to reproduction data, a focus error signal for a servo control, and a tracking error signal. In addition, it generates a push pull signal as a signal in relation to wobbling of the grooves, i.e., a signal for detecting wobbling.

Reproduction information signal outputted from the matrix circuit 104 is fed to a data detection processing unit 105, the focus error signal and the tracking error signal are fed to an optical block servo circuit 111, and the push pull signal is fed to a wobble signal processing circuit 106.

The data detection processing unit 105 binarizes the reproduction information signal. For example, the data detection processing unit 105 performs A/D conversion processing of an RF signal, reproduction clock generation processing by PLL, PR (partial response) equalization processing and viterbi decoding (maximum likelihood decoding), and receives a binary data string by a PRML (partial response maximum likelihood) detection method. The data detection processing unit 105 feeds the binary data string as information read from the optical disc 100 to an encode/decode unit 107 in a later part.

The encode/decode unit 107 demodulates reproduction data upon reproduction, and modulate recording data upon record. Specifically, data demodulating, deinterleaving, ECC decoding, address decoding are performed upon reproduction, and ECC encoding, interleaving, and data modulating are performed upon record.

Upon reproduction, the binary data string demodulated at the data detection processing unit 105 is fed to the encode/decode unit 107. The encode/decode unit 107 demodulates the binary data string to receive reproduction data from the optical disc 100. Specifically, run length limited code modulation such as RLL (1,7) PP modulation is applied, and demodulation processing to the data recorded on the optical disk 100 and ECC decode processing for correcting errors are performed, thereby providing reproduction data from the optical disc 100.

The data decoded by the encode/decode unit 107 to the reproduction data is transferred to a host interface 108, and is transferred to a host device 200 based on an instruction by a system controller 110. Examples of the host device 200 includes a computer device and an AV (audio visual) system device.

Upon record/reproduction in the optical disc 100, ADIP information is processed. In other words, the push pull signal outputted from the matrix circuit 104 as the signal in relation to wobbling of the grooves will be digitized wobble data in the wobble signal processing circuit 106. By PLL processing, a clock synchronized with the push pull signal is generated. Wobble data is demodulated to a data stream configuring an ADIP address at an ADIP demodulation processing unit 116, and is fed to an address decoder 109. The address decoder 109 decodes the fed data, acquires an address value, and feeds the address value to the system controller 110.

Upon record, record data is transmitted from the host device 200. The record data is fed to the encode/decode unit 107 via the host interface 108. The encode/decode unit 107 performs error correction code addition (ECC encode), interleave, subcode addition as encode processing of the record data. The data thus processed is subjected to run length limited code modulation such as an RLL (1-7) PP method.

The record data processed at the encode/decode unit 107 is fed to a light strategy unit 114. The light strategy unit 114 adjusts a laser driven pulse waveform for recording layer properties, a laser light spot shape, and a recording linear speed as record compensation processing. Then, the light strategy unit 114 outputs a laser driven pulse to the laser driver 113.

The laser driver 113 flows a current to the laser diode in the light pickup 101 based on the laser driven pulse on which the record compensation processing is done, and emits laser light. In this manner, a mark corresponding to the record data is formed on the optical disk 100.

The optical block servo circuit 111 generates a variety of servo drive signals including focus, tracking and thread from the focus error signal and the tracking error signal from the matrix circuit 104, and executes a servo operation. In other words, a focus drive signal and a tracking drive signal are generated in accordance with the focus error signal and the tracking error signal, the driver 118 drives a focus coil and a tracking coil in the biaxial mechanism within the optical pickup 101. It generates a tracking servo loop and a focus servo loop by the optical pickup 101, the matrix circuit 104, the optical block servo circuit 111, the driver 118, and the biaxial mechanism.

In addition, the optical block servo circuit 111 closes the tracking servo loop depending on a track jump command from the system controller 110, and outputs a jump drive signal to execute a track jump operation. Furthermore, the optical block servo circuit 111 generates a thread error signal acquired as a low frequency component of the tracking error signal, and a thread drive signal based on an access execution control from the system controller 110 to drive the thread mechanism 103 by the thread driver 115.

A spindle servo circuit 112 controls to rotate the spindle motor 102 at the CLV. The spindle servo circuit 112 acquires a clock generated by the PLL to the wobble signal as rotation speed information of the spindle motor 102 at present, and compares the rotation speed information with predetermined CLV reference speed information to generate a spindle error signal. Upon data reproduction, a reproduced clock generated by the PLL within the data detection processing unit 105 is the rotation speed information of the spindle motor 102 at present, which is compared with the predetermined CLV reference speed information to generate the spindle error signal. The spindle servo circuit 112 outputs a spindle drive signal generated depending on the spindle error signal, and rotates the spindle motor 102 at the CLV by a spindle driver 117.

The spindle servo circuit 112 generates the spindle drive signal depending on a spindle kick/brake control signal from the system controller 110, and executes the operations including start-up, stop, acceleration and deceleration of the spindle motor 102.

A variety of operations of a servo system and a record/reproduction system described above are controlled by the system controller 110 formed of a microcomputer. The system controller 110 executes a variety of processing depending on commands from the host device 200 via the host interface 108. For example, when a write command is issued from the host device 200, the system controller 110 firstly moves the optical pickup 101 to the address to be written. The encode/decode unit 107 executes the encode processing as described above in relation to the data transmitted from the host device 200 (such as video data and audio data). Depending on the data encoded, the laser driver 113 emits laser light to execute record.

For example, when a read command for transferring the data recorded in the optical disc 100 is supplied from the host device 200, the system controller 110 firstly performs a seek operation control for seeking the address designated. In other words, it issues an command on the optical block servo circuit 111 to execute an access operation of the optical pickup 101 where the address designated by the seek command is targeted. Thereafter, an operation necessary for transferring data within a data segment designated to the host device 200 is controlled. Specifically, data is read from the optical disc 100, reproduction processing is executed in the data detection processing unit 105 and the encode/decode unit 107, and necessary data is transferred.

Note that FIG. 1 shows the optical disc apparatus connected to the host device 200, but an optical disc apparatus may not be connected to other device. In this case, an operation unit and a display unit may be disposed, and a configuration of a data input/output interface unit may be different from that shown in FIG. 1. In other words, record and reproduction are done depending on a user's operation, and a terminal for inputting and outputting a variety of data may be formed. It should be appreciated that a wide variety of configurations of the optical disc apparatus may be possible.

[Optical Pickup]

Figure 2:
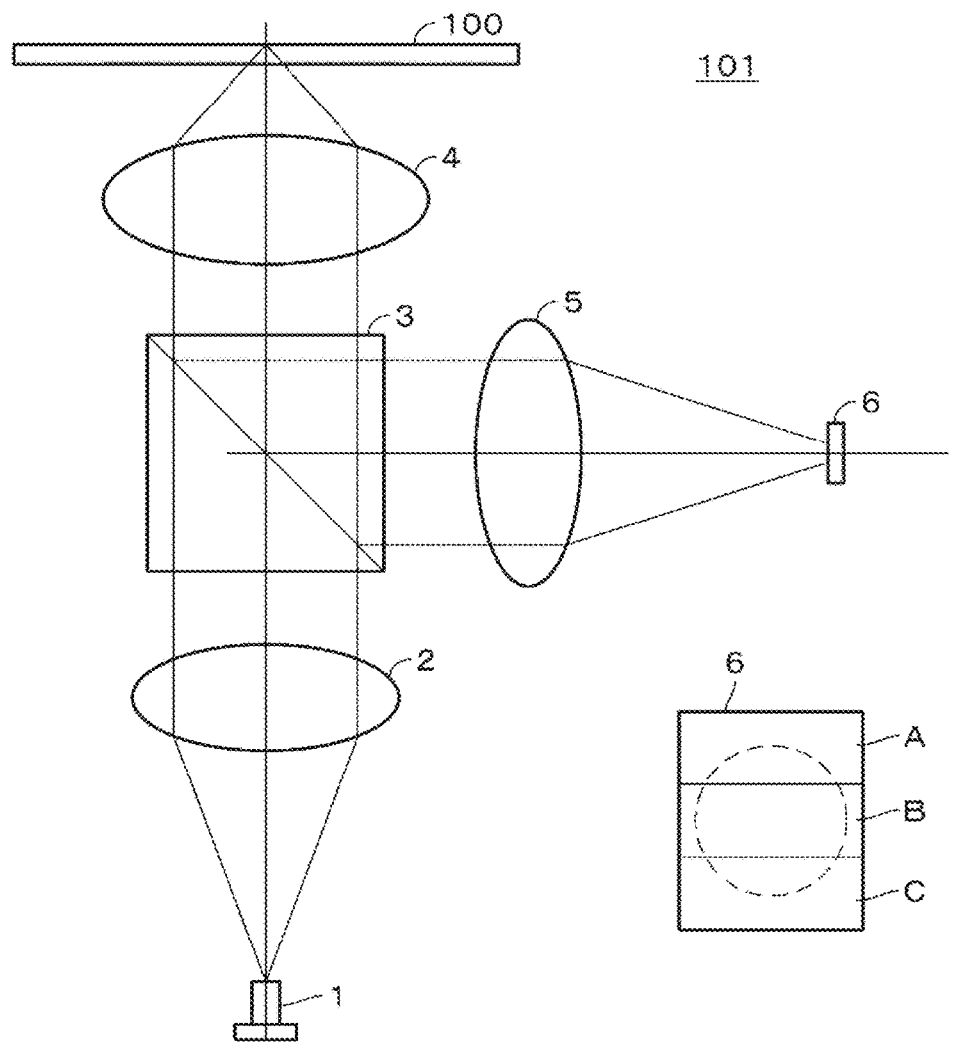
FIG. 2 A schematic diagram showing a structure of an optical pickup according to one embodiment of the present disclosure.

Next, the optical pickup 101 used in the above-described optical disk apparatus will be described referring to FIG. 2. The optical pickup 101 records information into the optical disc 100 and reproduces the information from the optical disc 100 using laser light (beam) having a wavelength λ of 405 nm, for example. The laser light is emitted from a semiconductor laser (LD: laser diode) 1.

The optical disc 100 is irradiated with the laser light passed through a collimator lens 2, a polarizing beam splitter (PBS) 3, and an objective lens 4. The polarizing beam splitter 3 has a split surface which transmits substantially 100% P polarized light, and reflects substantially 100% S polarized light. The reflected light from the recording layer of the optical disc 100 returns back through the same optical path, and is incident on the polarizing beam splitter 3. By inserting a λ/4 element (not shown), substantially 100% incident laser light is reflected at the polarizing beam splitter 3.

The laser light reflected at the polarizing beam splitter 3 is collected on a light receiving surface of a photodetector 6 via the lens 5. The photodetector 6 has a light receiving cell for photoelectrically converting the incident light on the light receiving surface. The light receiving cell is split into three regions A, B and C by a line for splitting into three in a tangential direction (track direction) of the optical disc 100, as an example. The photodetector 6 outputs three electrical signals corresponding to respective light received amounts on the three regions A, B and C of the light receiving cell. An illustrative method of splitting the regions will be described later in detail. In FIG. 2, the optical pickup 101 has a minimum configuration only for illustrating the present disclosure. Signals such as the focus error signal outputted to the optical block servo circuit 111 via the matrix circuit 104, the tracking error signal, and the push pull signal outputted to the wobble signal processing circuit 106 via the matrix circuit 104 are omitted. A variety of configurations other than that shown in FIG. 2 may be possible.

A cross section of a light flux of return beam from the optical disc 100 is split into a plurality of regions to provide the reproduction information signals corresponding to the respective regions. As a method of providing the reproduction information signal per region, the method other than splitting the photodetector 6 can be used. For example, there may be used a method of arranging an optical path conversion element for splitting a plurality of regions in an optical path passing through the objective lens 4 to the photodetector 6, and feeding a plurality of beams split by the optical path conversion element to a different photodetector. Examples of the optical path conversion element includes a diffraction element such as a holographic optical element and a refractive element such as a microprism.

[Data Detection Processing Unit]

Figure 3:
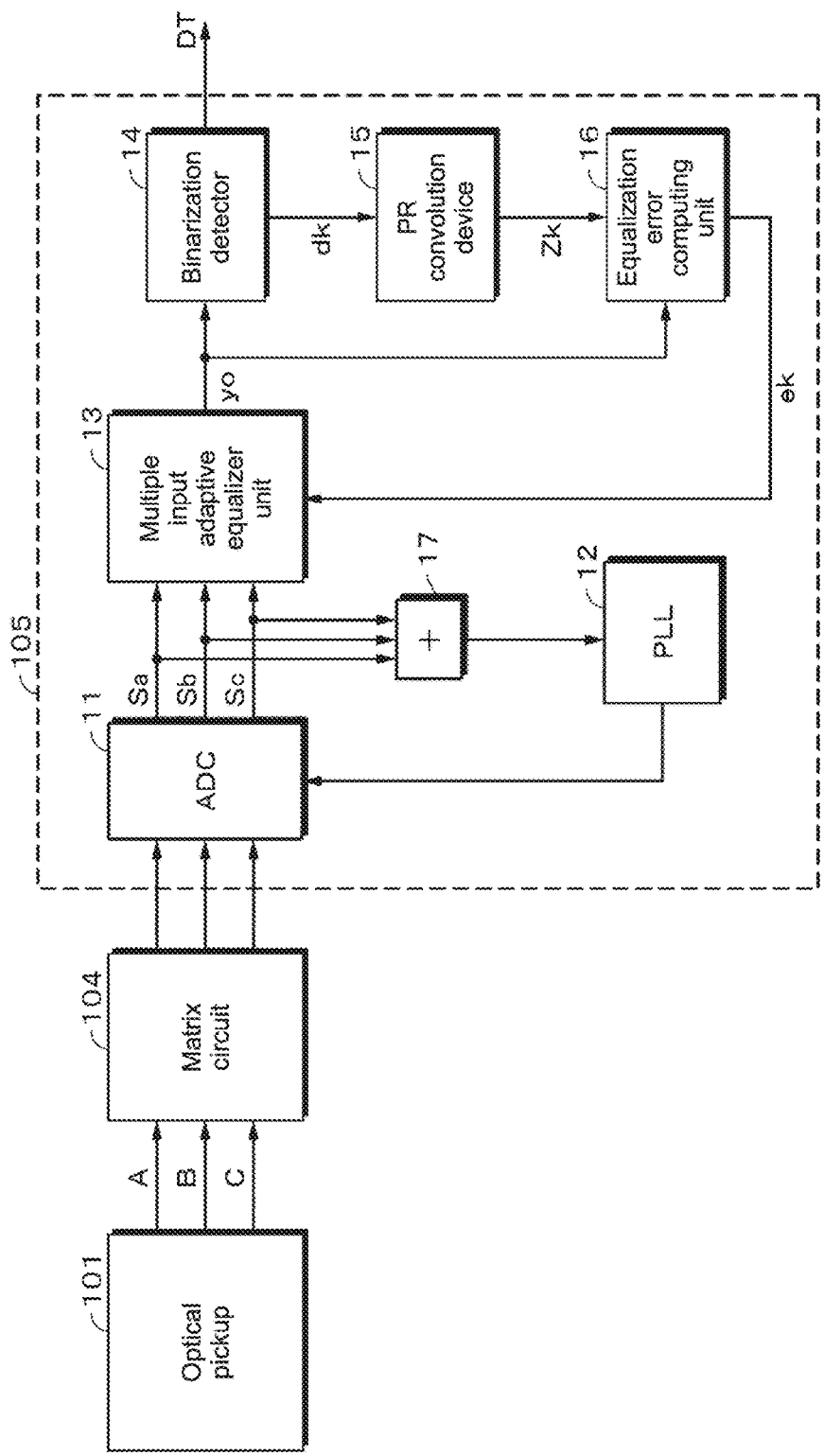
FIG. 3 A block diagram showing an illustrative data detection processing unit according to one embodiment.

As described above, the data is reproduced from the optical disc 100 by the optical pickup 101, the detection signals of the regions A to C are fed to the matrix circuit 104, which become the reproduction information signals corresponding to the regions. The data detection processing unit 105 includes an A/D converter 11 to which the reproduction information signals fed from the matrix circuit 104 are fed, as shown in FIG. 3. A clock for the A/D converter 11 is formed by a PLL 12. The reproduction information signals fed from the matrix circuit 104 are converted into digital data at the A/D converter 11. The reproduction information signals digitized of the regions A to C are represented by Sa to Sc. To the PLL 12, the signals to which the reproduction information signals Sa to Sc added at an adder circuit 17 are fed.

In addition, the data detection processing unit 105 includes a multiple input adaptive equalizer unit 13, a binarization detection unit 14, a PR convolution device 15, and an equalization error computing unit 16.

The multiple input adaptive equalizer unit 13 performs PR adaptive equalization processing on the reproduction information signals Sa to Sc. In other words, the reproduction information signals Sa to Sc are equalized to approximate to the PR waveform to be intended. Respective equalized outputs are added to output an equalization signal y0.

As the signal for inputting to the PLL 12, the output from the multiple input adaptive equalizer unit may be used. In this case, an initial modulus of the multiple input adaptive equalizer unit is set to a predetermined value.

The binarization detection unit 14 is a viterbi decoder, for example. The equalization signal y0 that is PR equalized is maximum likelihood decoded to provide binary data DT. The binary data DT is fed to the encode/decode unit 107 shown in FIG. 1 where the reproduction data is demodulated. For the viterbi decoding, there is used a viterbi detection unit configured of a plurality of states having continuous bits with predetermined lengths as units and of braches represented by transitions therebetween. From all possible bit series, the desirable bit series can be effectively detected.

In an actual circuit, two registers are prepared for each state. One is a register for storing partial response series and a signal path metric to the state, which is called as a path metric register. The other is a register for storing a flow of the bit series to the state, which is called as a path memory register. In addition, for each branch, the partial response series in the bit, which is called as a branch metric unit, and a computing unit for calculating the signal path metric are prepared.

By the viterbi detection unit, a variety of bit series can be correlated one by one with one of paths passing the state. The partial response series passing through the path and the pass metric between the actual signals (reproduction signals) can be provided by sequentially adding transitions between the states configuring the path, i.e., the above-described branch metric in the branch.

The path for minimizing the path metric can be selected by comparing the sizes of the path metric belonging to the two or less of branches in the state, and sequentially selecting the smaller path metric. When selection information is transferred to the path memory resister, information where the path arriving each state is represented by the bit series is stored. The value of the path memory resister is sequentially updated and converged to the bit series such that the path metric is finally minimum. The results are outputted.

The PR convolution device 15 performs convolution processing of a binarized result, and generates a target signal Zk, as shown in the equation below. The target signal Zk is provided by convoluting the binarized result, and is therefore a noiseless ideal signal. For example, in the case of PR (1, 2, 2, 2, 1), a value P per channel clock is (1, 2, 2, 2, 1). A constraint length is 5. In the case of PR (1, 2, 3, 3, 3, 2, 1), the value P per channel clock is (1, 2, 3, 3, 3, 2, 1). The constraint length is 7. When a recording density is increased so that a capacity exceeds 35 GB (with the wavelength λ of the laser light=405 nm, the NA of the objective lens=0.85, the track pitch=0.32 μm constant), the detection is difficult if the constraint length of the partial response is prolonged from 5 to 7 to increase a detection capacity. Note that d represents the binarized data in the following equation.

[Numerical Formula 1]

$$Z_n = \sum_m P_m d_{n-m} \quad (1)$$

$$P = (1, 2, 3, 3, 3, 2, 1)$$
$$P = (1, 2, 2, 2, 1)$$

Figure 6:
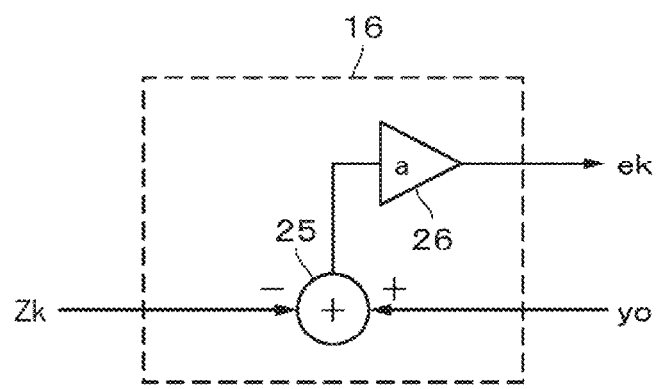
FIG. 6 A block diagram showing an equalization error computing unit.

The equalization error computing unit 16 determines an equalization error ek from the equalization signal y0 of the multiple input adaptive equalizer unit 13 and the target signal Zk, and feeds the equalization error eK to the multiple input adaptive equalizer unit 13 for controlling a tap coefficient. As shown in FIG. 6, the equalization error computing unit 16 includes a subtractor 25 and a coefficient multiplier 26. The subtractor 25 subtracts the target signal Zk from the equalization signal y0. To the subtraction result, a predetermined coefficient "a" is multiplied by the coefficient multiplier 26, thereby generating the equalization error.

Figure 4:
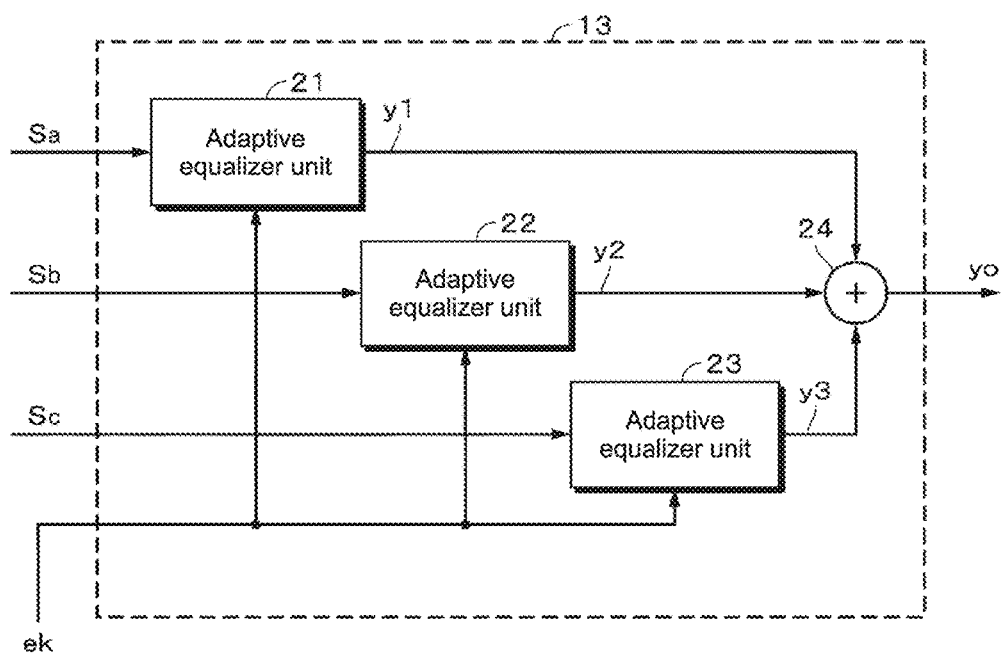
FIG. 4 A block diagram showing an illustrative multiple input adaptive equalizer in the data detection processing unit.

The multiple input adaptive equalizer unit 13 includes adaptive equalizer units 21, 22 and 23 and an adder 24, as shown in FIG. 4. The above-described reproduction information signal Sb is inputted to the adaptive equalizer unit 22, the reproduction information signal Sa is inputted to the adaptive equalizer unit 21, and the reproduction information signal Sc is inputted to the adaptive equalizer unit 23. FIG. 4 shows a configuration of the multiple input adaptive equalizer unit 13 when the number of split regions are three. Corresponding to the number of split regions, the adaptive equalizer units are provided.

Each of the adaptive equalizer units 21, 22 and 23 has parameters of an FIR (Finite Impulse Response) filter tap number, its computation accuracy (bit resolution), and an update gain of adaptive computation, each of which are set to an optimum value. To each of the adaptive equalizer units 21, 22 and 23, the equalization error eK is fed as a coefficient control value.

Outputs y1, y2 and y3 of the adaptive equalizer units 21, 22 and 23 are added by the adder 24, and are outputted as the equalization signal y0 of the multiple input adaptive equalizer unit 13. An output target of the multiple input adaptive equalizer unit 13 is has an ideal PR waveform where the binarized result is convoluted into the PR (partial response).

Figure 5:
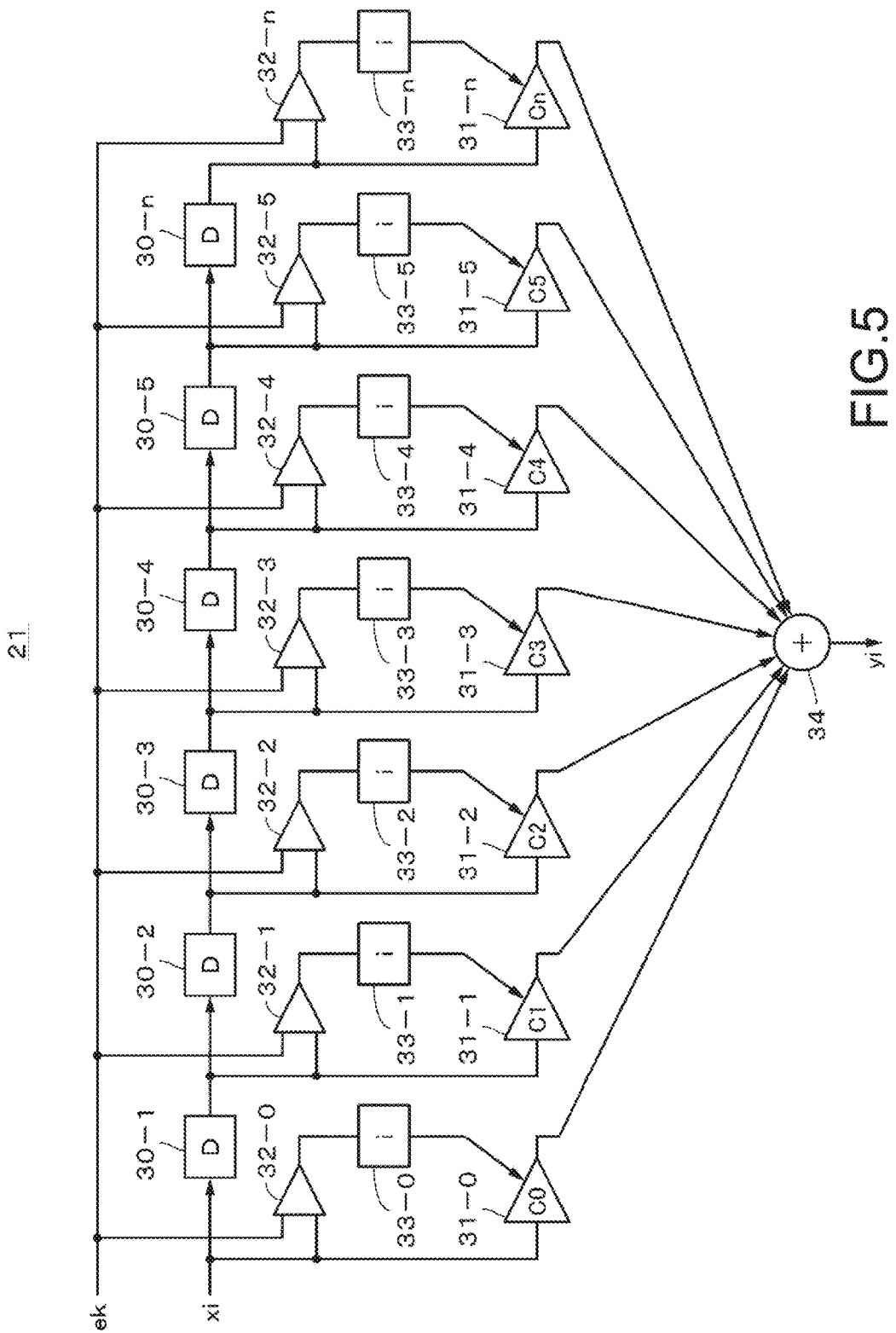
FIG. 5 A block diagram showing an illustrative multiple input adaptive equalizer.

The adaptive equalizer unit 21 is configured of an FIR filter as shown in FIG. 5, for example. The adaptive equalizer unit 21 is a filter having n+1 step tap including delay elements 30-1 to 30-n, coefficient multipliers 31-0 to 31-n, and an adder 34. The coefficient multipliers 31-0 to 31-n multiply tap coefficients C0 to Cn to an input x at each time point. Outputs of the coefficient multipliers 31-0 to 31-n are added by the adder 34, and are taken out as an output y.

In order to perform adaptive equalization processing, the tap coefficients C0 to Cn are controlled. For this purpose, the equalization error eK and computing units 32-0 to 32-n are disposed where each tap input is inputted and computed. Integrators 33-0 to 33-n for integrating the outputs of the respective computing units 32-0 to 32-n are provided. At each of the computing units 32-0 to 32-n, −1 x ek x x is computed, for example. Outputs of the computing units 32-0 to 32-n are integrated at the integrators 33-0 to 33-n. From the integration results, the tap coefficients C0 to Cn of the coefficient multipliers 31-0 to 31-n are changed and controlled. The integration by the integrators 33-0 to 33-n is for controlling an response of an adaptive coefficient control.

In the data detection processing unit 105 having the above-described configuration, unnecessary signals such as cross talk are decreased, and the binarized data is decoded.

The adaptive equalizer units 22 and 23 each has a configuration similar to that of the adaptive equalizer unit 21. A common equalization error ek is fed to the adaptive equalizer units 21, 22 and 23 to perform adaptive equalization. In other words, the adaptive equalizer units 21, 22 and 23 optimize, i.e., perform adaptive PR equalization of, errors and phased distortion of input signal frequency components of the reproduction information signals Sa, Sb and Sc. Specifically, depending on a computing result of −1 x ek x x at the computing units 32-0 to 32-n, the tap coefficients C0 to Cn are adjusted. More specifically, the tap coefficients C0 to Cn are adjusted for eliminating the equalization error.

In this manner, in the adaptive equalizer units 21, 22 and 23, the tap coefficients C0 to Cn are adaptive controlled to have target frequency properties using the equalization error ek. The equalization signal y0 of the multiple input adaptive equalizer unit 13 provided by adding the outputs y1, y2 and y3 of the adaptive equalizer units 21, 22 and 23 by the adder 24 is a signal where the cross talk is decreased.

[First Example of Region Split]

Figure 7:
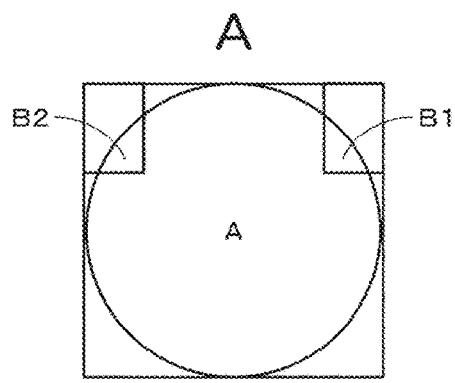
FIG. 7 Schematic diagrams for each illustrating a first embodiment of region split.
Figure 7:
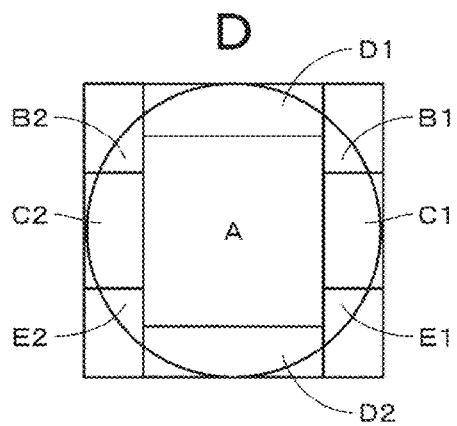
Figure 7:
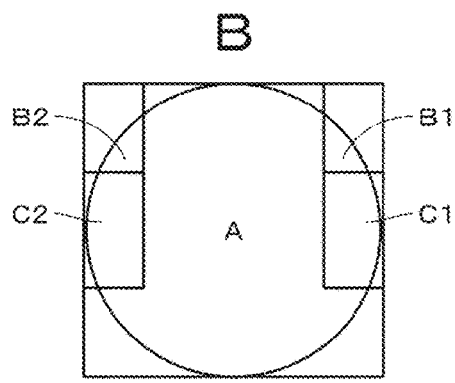
Figure 7:
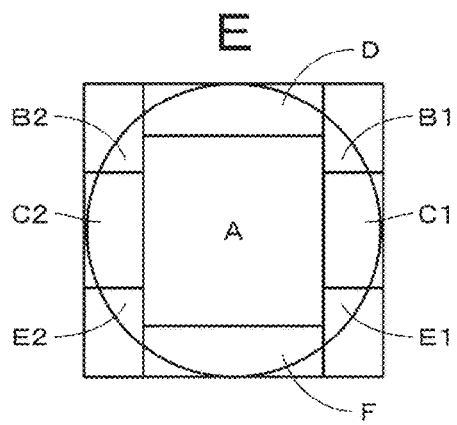
Figure 7:
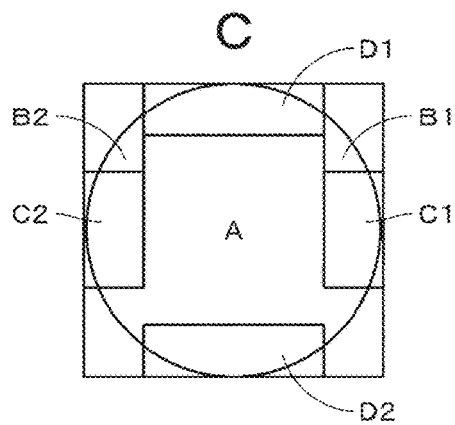

In the above-described description, the cross section of the light flux of the return beam from the optical disc 100 is split into three. According to the present disclosure, the quality of the reproduction information signal can be increased to cancel the cross talk even when the number of split is other than three. Referring to FIG. 7, a first embodiment of region split will be described.

FIG. 7A shows an embodiment that the beam is split into two: region A and region B(=B1 +B2). FIG. 7B shows an embodiment that the beam is split into three: region A, region B (=B1 +B2) and region C(=C1+C2). FIG. 7C shows an embodiment that the beam is split into four: region A, region B(=B1 +B2), region C(=C1 +C2) and region D(=D1 +D2). FIG. 7D shows an embodiment that the beam is split into five: region A and region B(=B1 +B2), region C (=C1 +C2), region D(=D1 +D2), and region E(=E1 +E2). FIG. 7E shows an embodiment that the beam is split into six: region A and region B(=B1 +B2), region C(=C1 +C2), region D, region E(=E1 +E2) and region F. In the region split diagrams, a vertical direction represents a tangential direction of a return light flux, and horizontal direction represents a radial direction of a light flux. The same applies to the following other embodiments.

Simulated results of the reproduction performance as to the region split will be described. The simulation is performed using the following optical disc reproduction system 1.

System 1: surface recording density (diameter 120 mm disc): 45 GB, linear recording density: 0.0532 µm/channel bit, track pitch: 0.25 µm (land/groove recording), NA: 0.91, λ: 405 nm, PR (1, 2, 2, 2, 1)

The system 1 is a 35 GB high density optical disc having a track pitch equivalent to BD. The "track pitch equivalent to BD" refers that one recording layer has a capacity of 35 GB under the condition of the blue ray disc's track pitch (0.32 µm).

[Reproduction Performance]

Figure 8:
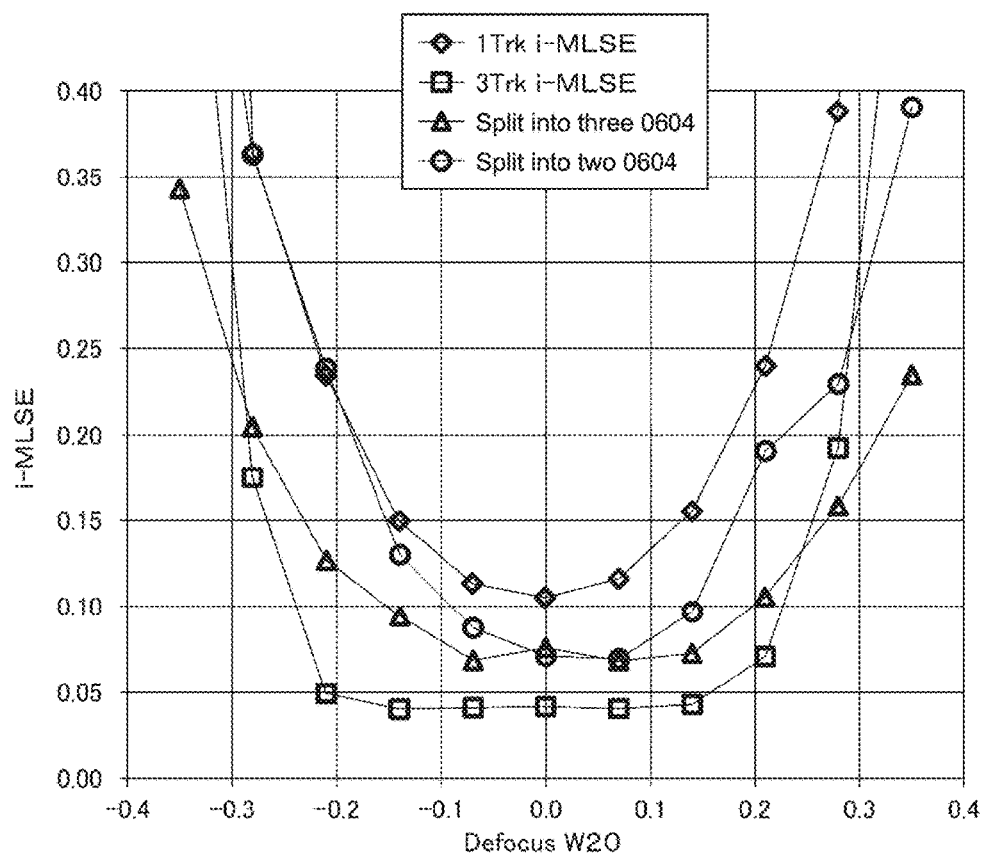
FIG. 8 A graph showing a reproduction performance by splitting into two and three.

FIG. 8 is a graph showing the simulated results: no region split, split into two, and split into three. In the graph, "split into three 0604" and "split into two 0604" represent region split positions in FIG. 7A and FIG. 7B: at a position of ±0.6 in a radial direction and ±0.4 in a tangential direction when a diameter is set to 1. For a comparison purpose, there are reproduction with no region split and no adaptive processing by the adaptive equalizer unit (denoted as 1Trk i-MLSE) and reproduction using a three track reproduction information signal described in Japanese Patent Application Laid-open No. 2012-079385 (denoted as 3Trk i-MLSE).

A horizontal axis of the graph in FIG. 8 represents a defocus amount normalized with a wavelength. A value 0 means the defocus amount 0. Actually, defocus is generated upon reproduction. It is necessary to provide a margin for the defocus.

A vertical axis of the graph in FIG. 8 is an index for representing the reproduction properties. As the index, a value of the i-MLSE is used. In an MLSE (maximum likelihood sequence error), an index corresponding to an error probability is calculated using a difference between a target level set by using viterbi detected data and an actual signal level. In the case of the BDXL™, an i-MLSE method is used for calculation by weighting some data patterns that easily induce errors.

When a recording density is increased higher than the BDXL™, the data patterns that easily induce errors are changed. As a result, the errors of the i-MLSE that is a signal index value in the related art will be a problem. According to the present disclosure, other signal evaluation value different from the i-MLSE is used for describing the effects. To the other evaluation value, new data patterns are added, which are necessary for improving accuracy of the signal index value at a higher line density. Hereinafter, the new index value with improved accuracy is called as an e-MLSE.

The data patterns added in the e-MLSE are the following three:

Bits 1 in each pattern string are inverted in an error pattern to a detection pattern.

Addition pattern (1): 10111101
Addition pattern (2): 1011110111101
Addition pattern (3): 10111100111101

At the line density similar to that of the BDXL™ in the related art having sufficient accuracy of the i-MLSE, the e-MLSE is substantially matched with the i-MLSE. At the higher line density, a difference appears due to improved errors. Theoretical correlations of both index values to the error rate that is practically import are the same therebetween. Although they are different in computation and in the range of the adaptive line density, evaluation values of signal qualities shown by them may be taken similarly.

As described later, according to one embodiment of the present disclosure, two optical discs having different capacities are supposed. As the index for evaluating the reproduction performance of the optical disc having a lower capacity, the i-MLSE is mainly used. As the index for evaluating the reproduction performance of the optical disc having a greater capacity, the e-MLSE is mainly used. Note that indices other than these may be used in the present disclosure.

In the above-described graph (defocus amount normalized vs index), the smaller the value of the i-MLSE or the e-MLSE is, the higher the reproduction performance is. As shown in FIG. 8, as compared with the case that no split is performed, the greater the split is, i.e., into two, three, the greater the performance is. Even if the split is into two, the index i-MLSE can be lowered. However, in the case of the split into two, the index value at bottom is great and a defocus margin is narrow as compared with (3Trk i-MLSE). As an example, it is desirable that the value of the i-MLSE or the e-MLSE be about 0.15 or less. Accordingly, the defocus margin corresponds to a the range that the value of the i-MLSE or the e-MLSE is about 0.15 or less. The greater the range is, the greater the defocus margin is.

Figure 9:
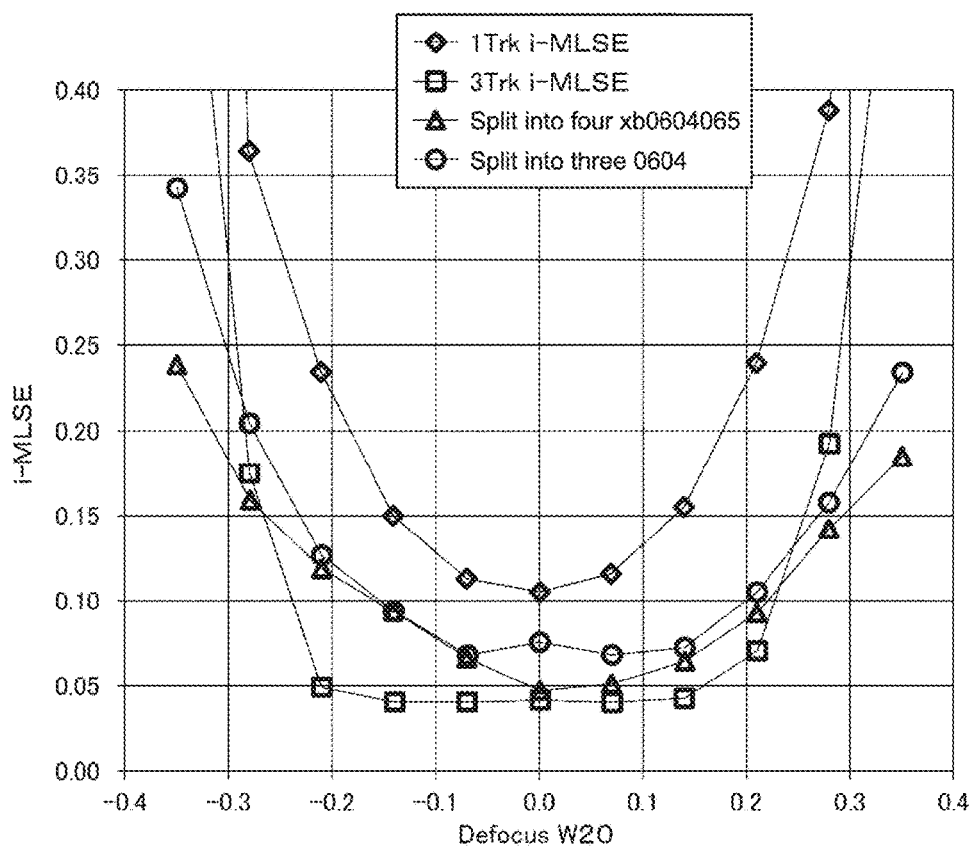
FIG. 9 A graph showing a reproduction performance by splitting into three and four.

FIG. 9 is a graph showing the simulated results: no region split, split into three, and split into four. For a comparison purpose, there are (1Trk i-MLSE) and (3Trk i-MLSE). In the graph, "split into four xb0604065" represents a region split position in FIG. 7C: at a position of ±0.6 in a radial direction and ±0.4 and ±0.65 in a tangential direction when a diameter is set to 1. As shown in FIG. 9, the index at bottom is smaller in the split into four as compared with that in the split into three.

Figure 10:
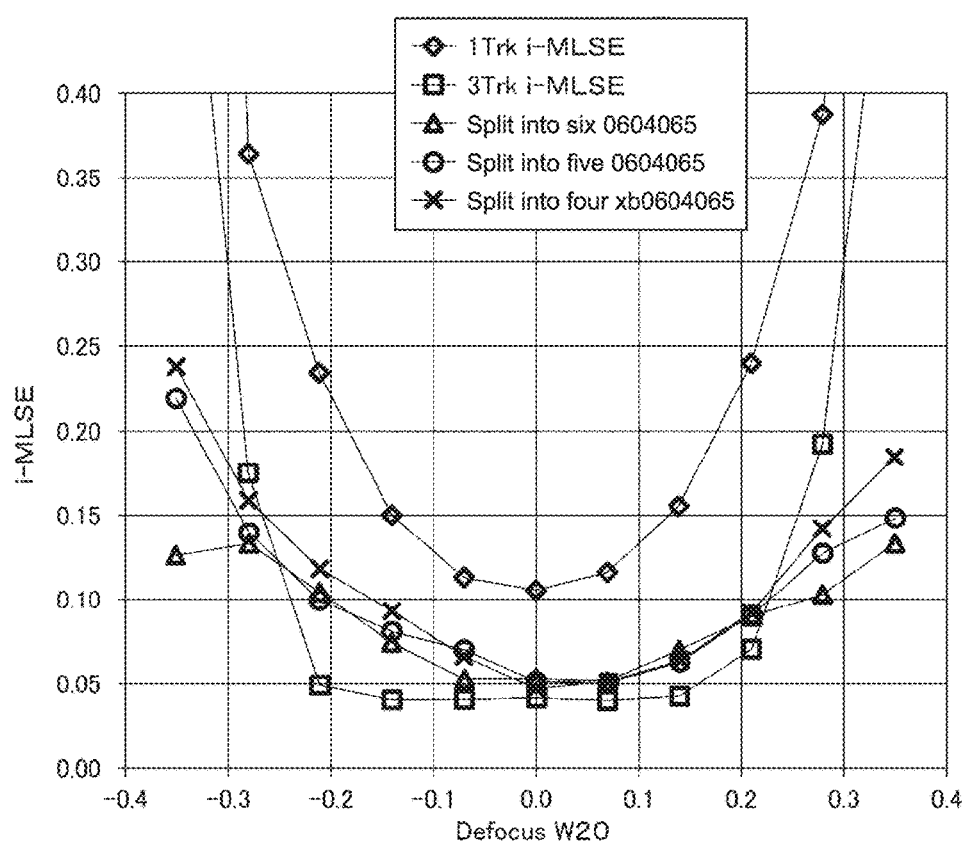
FIG. 10 A graph showing a reproduction performance by splitting into four, five and six.

FIG. 10 is a graph showing the simulated results: no region split, split into four, split into five, and split into six. For a comparison purpose, there are (1Trk i-MLSE) and (3Trk i-MLSE). In the graph, "split into five 0604065" and "split into six 0604065" represent region split positions in FIG. 7D and FIG. 7E: at a position of ±0.6 in a radial direction and ±0.4 and ±0.65 in a tangential direction when a diameter is set to 1. As shown in FIG. 10, when the number of the split is increased, a gentle improvement is possible.

Figure 11:
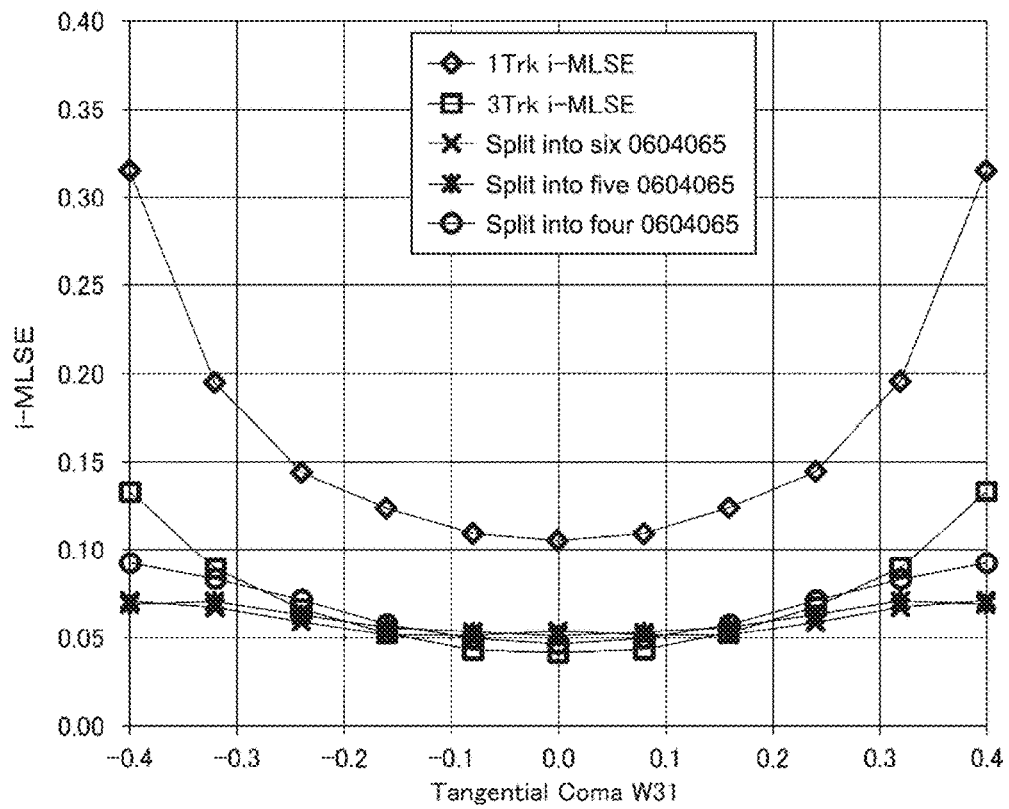
FIG. 11 A graph for explaining a margin for a skew in a tangential direction of a disc.
Figure 12:
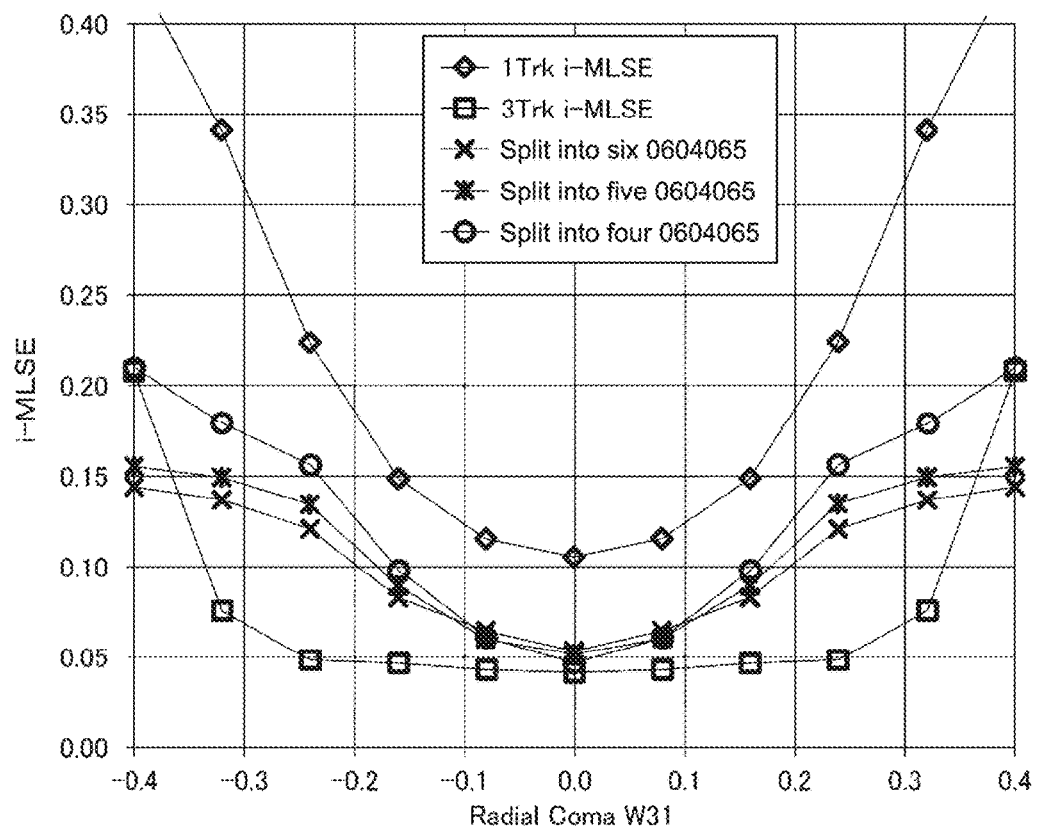
FIG. 12 A graph for explaining a margin for a skew in a radial direction of a disc, illustrating a third embodiment of region split, and showing a reproduction performance.

An improvement effect as to the defocus margin that is an important margin is shown also in other embodiments. Other than that, a margin to a disc skew is also important. Corresponding to the first embodiment of the region split, FIG. 11 shows a margin for tertiary coma aberration W31 (aberration coefficient normalized with a wavelength) corresponding to a skew in a tangential direction of a disc. FIG. 12 shows a margin for the tertiary coma aberration W31 corresponding to a skew in a radial direction of the disc. Similarly as above, for a comparison purpose, there are (1Trk i-MLSE) and (3Trk i-MLSE). As shown in FIG. 11 and FIG. 12, the margins equivalent to that of the (3Trk i-MLSE) are provided, and when the number of the split is increased, a gentle improvement is possible.

[Second Example of Region Split and Reproduction Performance]

Figure 13:
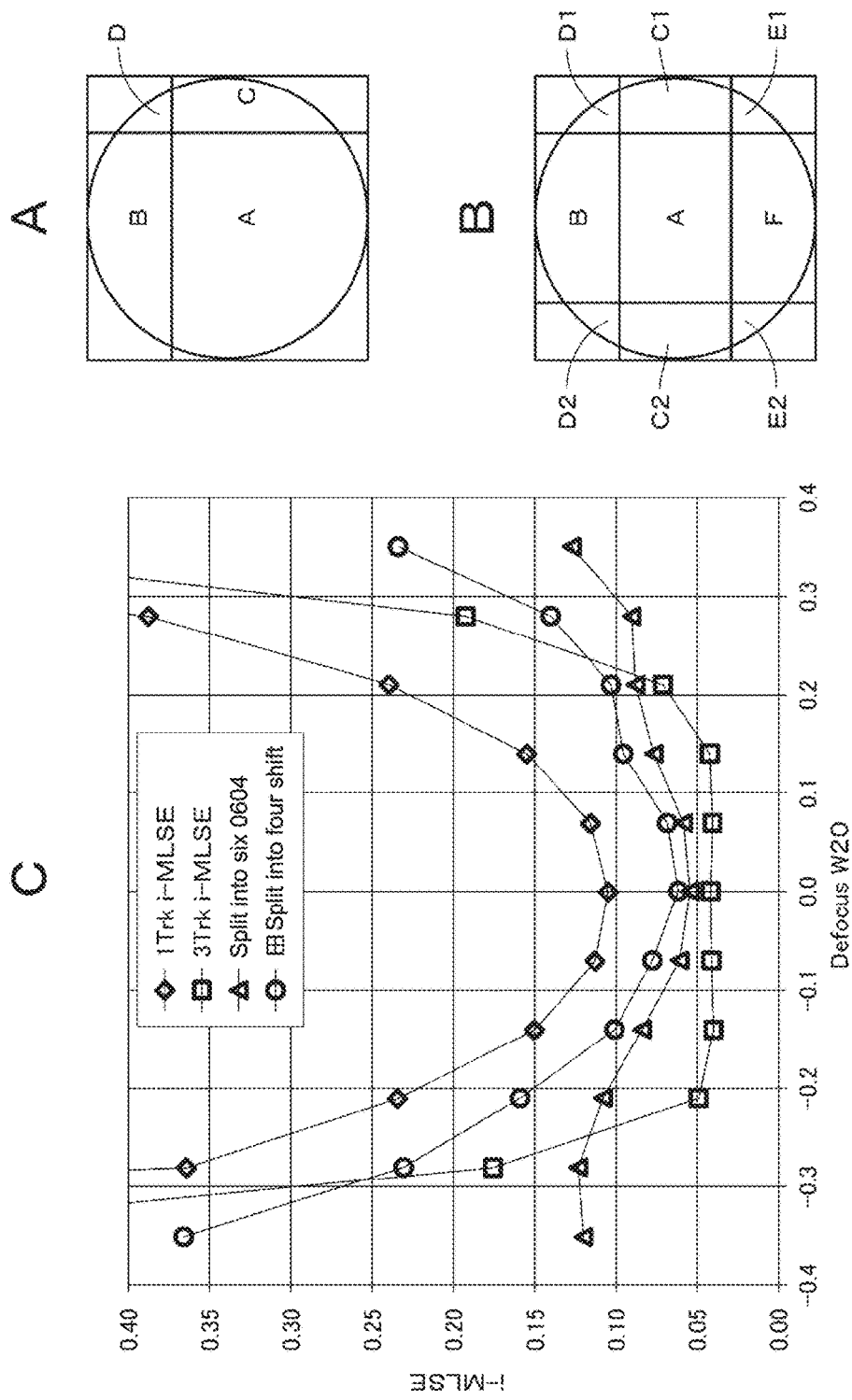
FIG. 13 A graph illustrating a second embodiment of region split, and showing a reproduction performance.

FIG. 13A shows a method of splitting a beam into four in tangential and radial directions to form the regions A to D. FIG. 13B shows a method of splitting a beam into nine in two parallel lines in coincide with a tangential direction and in two parallel lines in coincide with a radial directions to form six regions A to F where respective two regions (C1, C2), (D1, D2) and (E1, E2) in symmetric positions are considered as one region.

FIG. 13C is a graph showing the reproduction properties when the regions are split. As the index, the value of the i-MLSE is used. In the case of the split into four (FIG. 13A) and the split into six (FIG. 13B), the index value at bottom can be smaller, and the defocus margin can be widened.

Simulated results of the reproduction performance as to the region split will be described. The simulation is performed using the following optical disc 2. The optical disc 2 has a track pitch narrower than that of the optical disc 1, and has a high density. With the high density, the reproduction properties are changed and improved by the region split and a split pattern.

System 2: surface recording density (diameter 120 mm disc): 63.8 GB, linear recording density: 0.0446 µm/ch bit, track pitch: 0.21 µm (land/groove recording), NA: 0.91, λ: 405 nm, PR (1, 2, 3, 3, 3, 2, 1)

The system 2 is a 41.8 GB high density optical disc having a track pitch equivalent to BD.

[Third Example of Region Split and Reproduction Performance]

FIG. 14A shows a method of splitting into four in a rhombus shape by split line angled ±45 degrees to the track direction to form the regions A to D. FIG. 14B shows a graph of the simulated results from the region split.

FIG. 14B is a graph showing the simulated results when the region split is done as shown in FIG. 14A. As the index, the e-MLSE is used. In FIG. 14B, the reproduction method with no region split in the related art is denoted as (1Trk e-MLSE), the reproduction method by splitting into four as shown in FIG. 14A is denoted as (CTC4), and the reproduction method using three tracks suggested earlier is denoted as (3Trk e-MLSE). As shown in the simulated results in FIG. 14B, when the split method shown in FIG. 14A is used, the index value at bottom can be sufficiently lowered, and the defocus margin having some degree of width can be provided.

Figure 14:
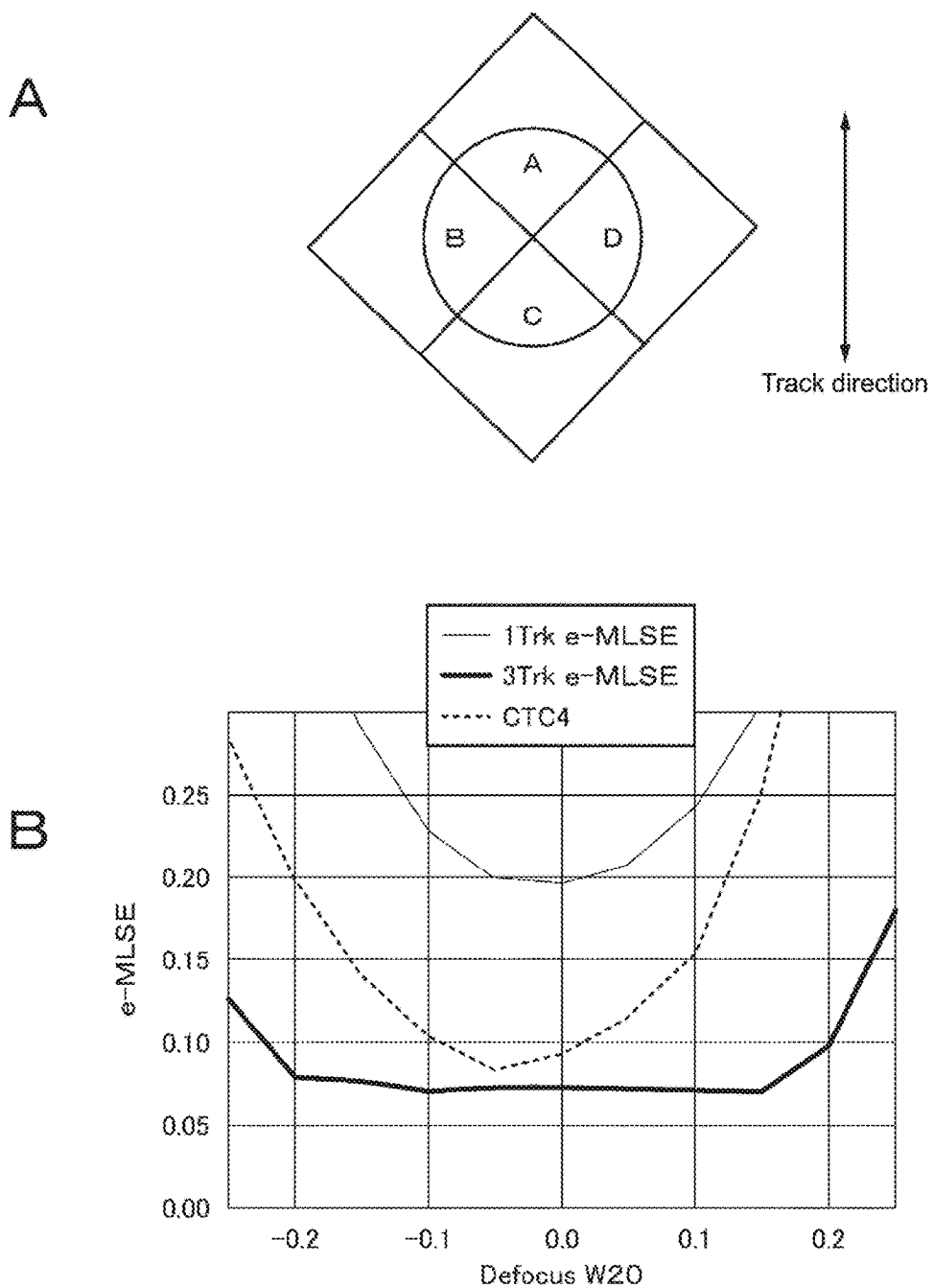
FIG. 14 A graph illustrating a third embodiment of region split, and showing a reproduction performance.

A signal Sn provided by performing the region split shown in FIG. 14 and the above-described adaptive equalization processing is represented by the following formula where a to d represent data included in the regions A to D.

[Numerical Formula 2]

$$S_n = \sum_{m=-15}^{15} k_m^a a_{k-m} + \sum_{m=-15}^{15} k_m^b b_{k-m} + \sum_{m=-15}^{15} k_m^c c_{k-m} + \sum_{m=-15}^{15} k_m^d d_{k-m} + C \quad (2)$$

[Fourth Example of Region Split and Reproduction Performance]

Figure 15:
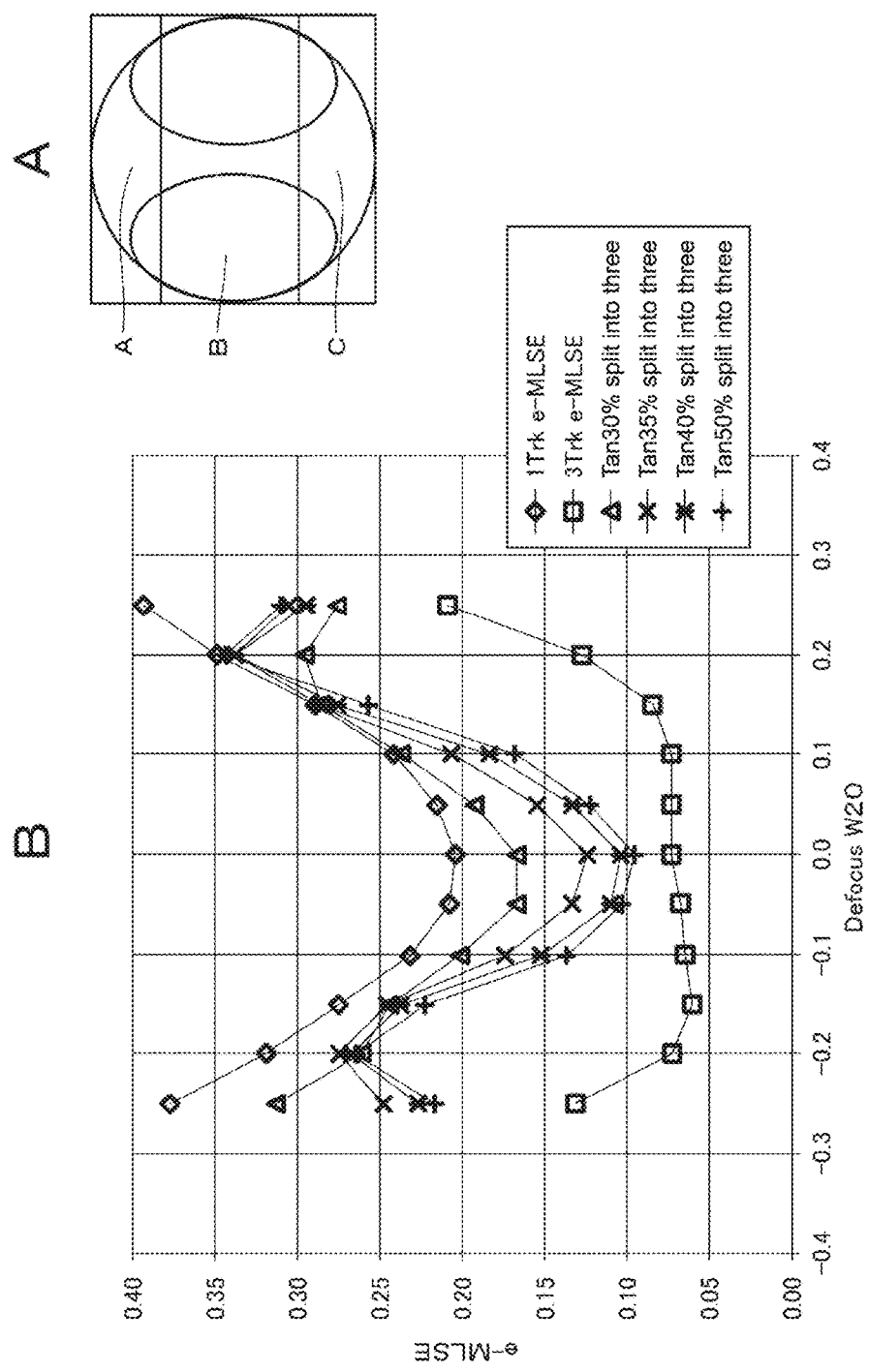
FIG. 15 A graph illustrating a fourth embodiment of region split, and showing a reproduction performance.

FIG. 15A shows a fourth embodiment method of region split, and FIG. 15B shows simulated results. A cross section of a light flux of a beam is corresponded to a shape of pupil of lens. For example, as to a circle beam, a vertical direction is a tangential direction, and a horizontal direction is a radial direction shown in FIG. 15A. There is also shown a region where ±primary order light of the reflected light from the optical disc is overlapped with 0th order light.

Two parallel lines extending in a radial direction split the beam into three in a tangential direction to form regions A, B and C. The split lines have a distance equal to a horizontal line passing through a beam center. For example, 30% split into three refers that the two lines have distance to the center line within ±30%. When a diameter of a beam circle is set to 1, a distance to the center line in the horizontal direction is ±0.3. Evaluation is made when four line positions, 30%, 35%, 40% and 50%, are set.

For a comparison purpose, there are used reproduction with no adaptive processing by the adaptive equalizer unit (1Trk e-MLSE) and reproduction using a three track reproduction information signal (3Trk e-MLSE).

A horizontal axis of the graph in FIG. 15B represents a defocus amount normalized with a wavelength. A value 0 means the defocus amount 0. Actually, defocus is generated upon reproduction. It is necessary to provide a margin for the defocus.

A vertical axis of the graph in FIG. 15B is an index for representing the reproduction properties. As the index, a value of the e-MLSE is used. In the case of the optical disc 2 having a recording density higher than that of the optical disc 1, a data pattern that easily induces errors is different. It is therefore desirable that the index e-MLSE be used, which is weighted by the data pattern to be considered.

In the above-described graph (defocus amount normalized vs index), the smaller the value of the e-MLSE is, the higher the reproduction properties is. As shown in FIG. 15B, in the case of split into three according to one embodiment of the present disclosure, the index is smaller than that of (1Trk e-MLSE). As compared with (3Trk e-MLSE), there are some insufficient points in that the index value is great and the defocus margin is narrow. However, it can be seen that the region split provides an improvement.

[Fifth Example of Region Split and Reproduction Performance]

Figure 16:
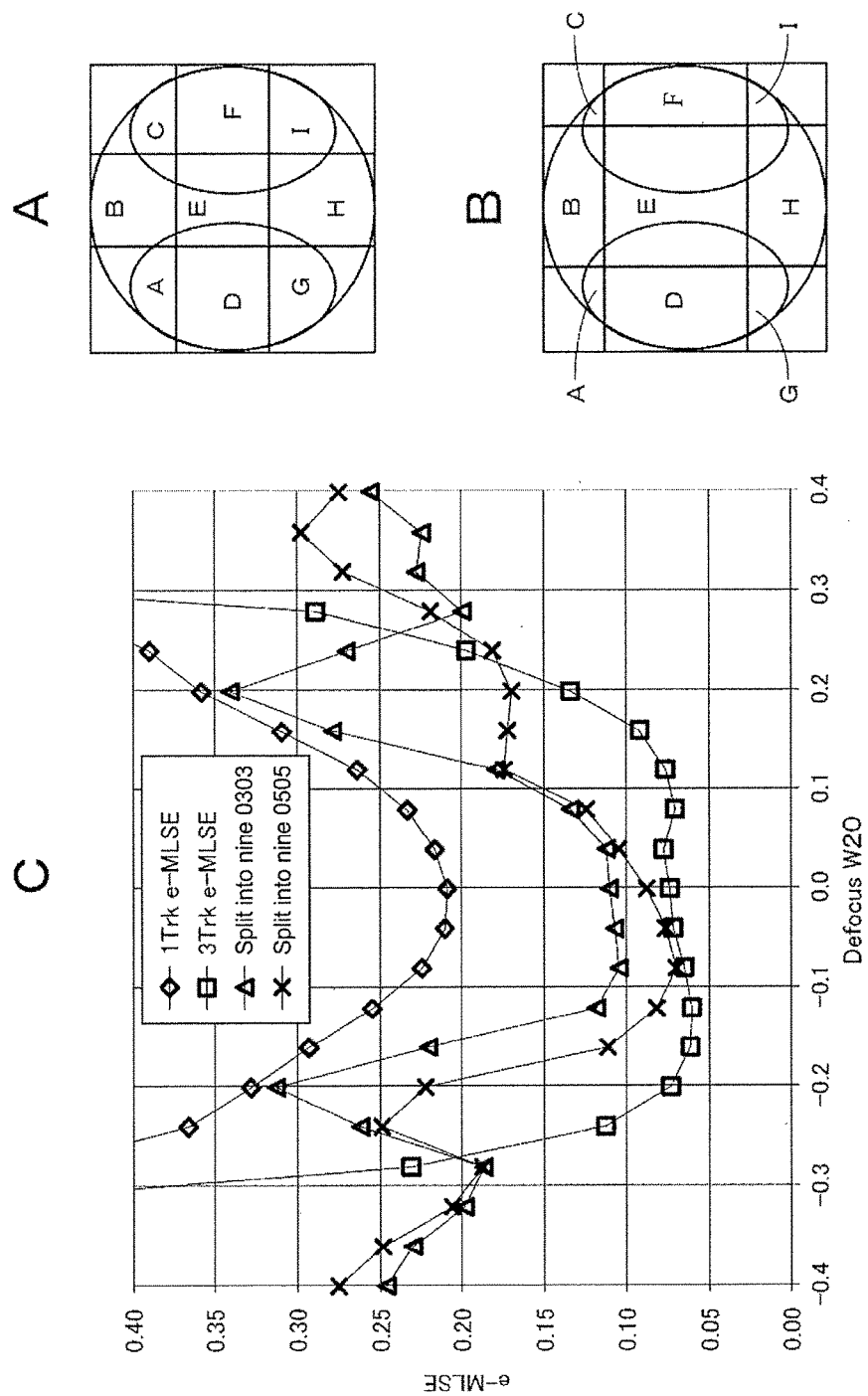
FIG. 16 A graph illustrating a fifth embodiment of region split, and showing a reproduction performance.

FIG. 16A and FIG. 16B each shows a fifth embodiment method of region split, and FIG. 16C is a graph showing simulated results. Two parallel lines extending in a radial direction split the beam into three in a tangential direction and two parallel lines extending in the tangential direction split the beam into three in the radial direction. As a result, nine regions A to I are formed. In FIG. 16A, split spaces are substantially the same. In FIG. 16B, the split is performed by widening spaces between the lines for split to increase an area of a center region E.

The reproduction performance is simulated for the respective split patterns shown in FIG. 16A and FIG. 16B. For a comparison purpose, there are used reproduction with no adaptive processing by the adaptive equalizer unit (1Trk e-MLSE) and reproduction using a three track reproduction information signal (3Trk e-MLSE).

In the graph of FIG. 16C, "split into nine 0303" and "split into nine 0505" represent region split positions in FIG. 16A and FIG. 16B: at a position of ±0.3 or ±0.5 in a radial direction and ±0.3 or ±0.5 in a tangential direction when a diameter is set to 1. As shown in the graph (defocus amount normalized vs index) of FIG. 16C, by increasing the number of split by nine, the index can be lowered as compared with the split into three. Also, the defocus margin can be wider.

[Sixth Example of Region Split and Reproduction Performance]

Figure 17:
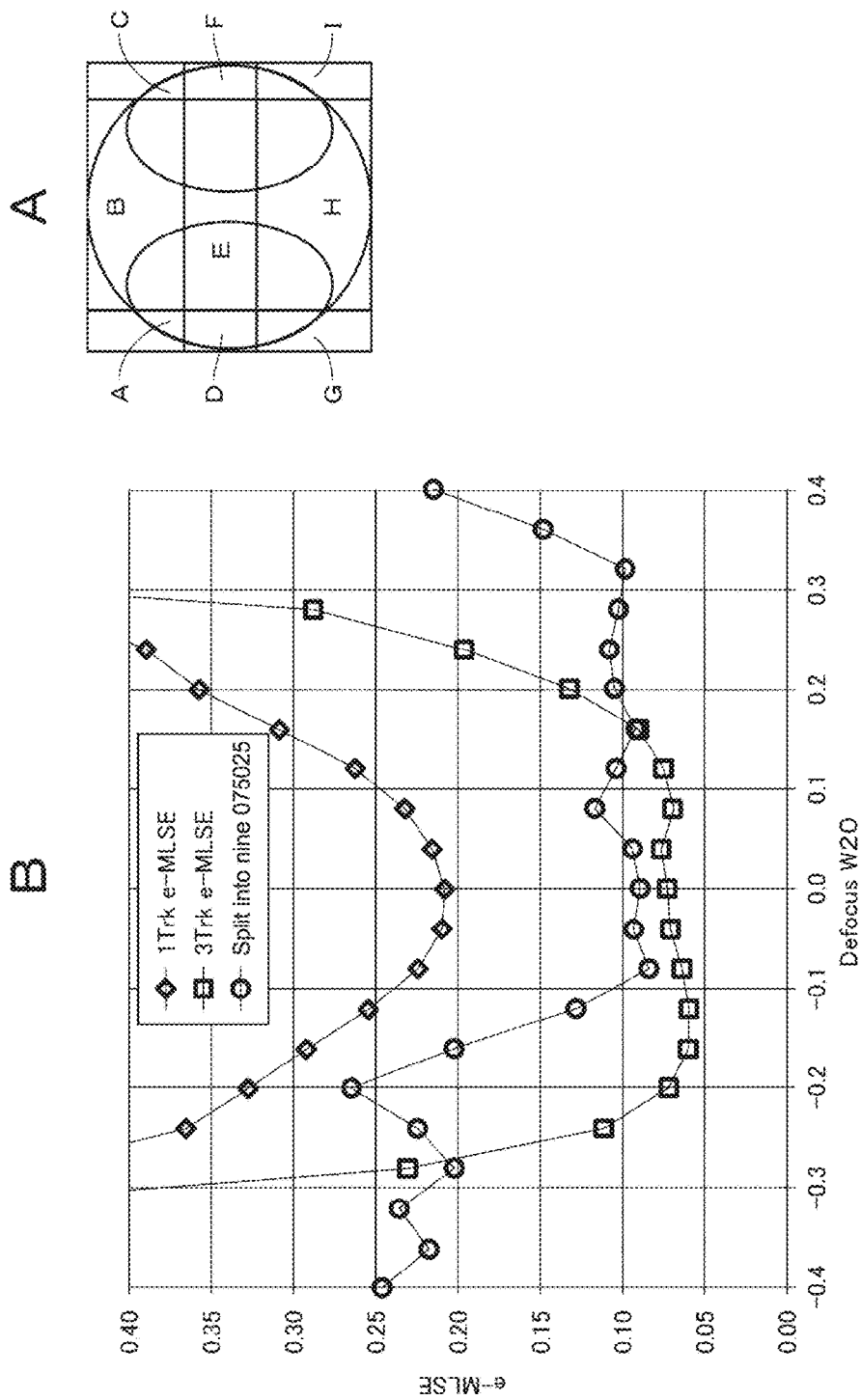
FIG. 17 A graph illustrating a sixth embodiment of region split, and showing a reproduction performance.

FIG. 17A shows a sixth embodiment method of region split, and FIG. 17B is a graph showing simulated results. As shown in FIG. 17A, two parallel lines extending in a radial direction split the beam into three in a tangential direction and two parallel lines extending in the tangential direction split the beam into three in the radial direction. As a result, nine regions A to I are formed.

The reproduction performance is simulated for the pattern shown in FIG. 17A. For a comparison purpose, there are used reproduction with no adaptive processing by the adaptive equalizer unit (1Trk e-MLSE) and reproduction using a three track reproduction information signal (3Trk e-MLSE).

In the graph of FIG. 17B, "split into nine 075025" represents a region split position in FIG. 17A: at a position of ±0.75 in a radial direction and ±0.25 in a tangential direction when a diameter is set to 1. As shown in the graph (defocus amount normalized vs index) of FIG. 17B, by splitting into nine and the split position is optimized as shown in FIG. 17A, the index can be lowered as compared with the split into three. Also, the defocus margin can be wider than the split method shown in FIG. 16A or FIG. 16B.

[Seventh Example of Region Split and Reproduction Performance]

Figure 18:
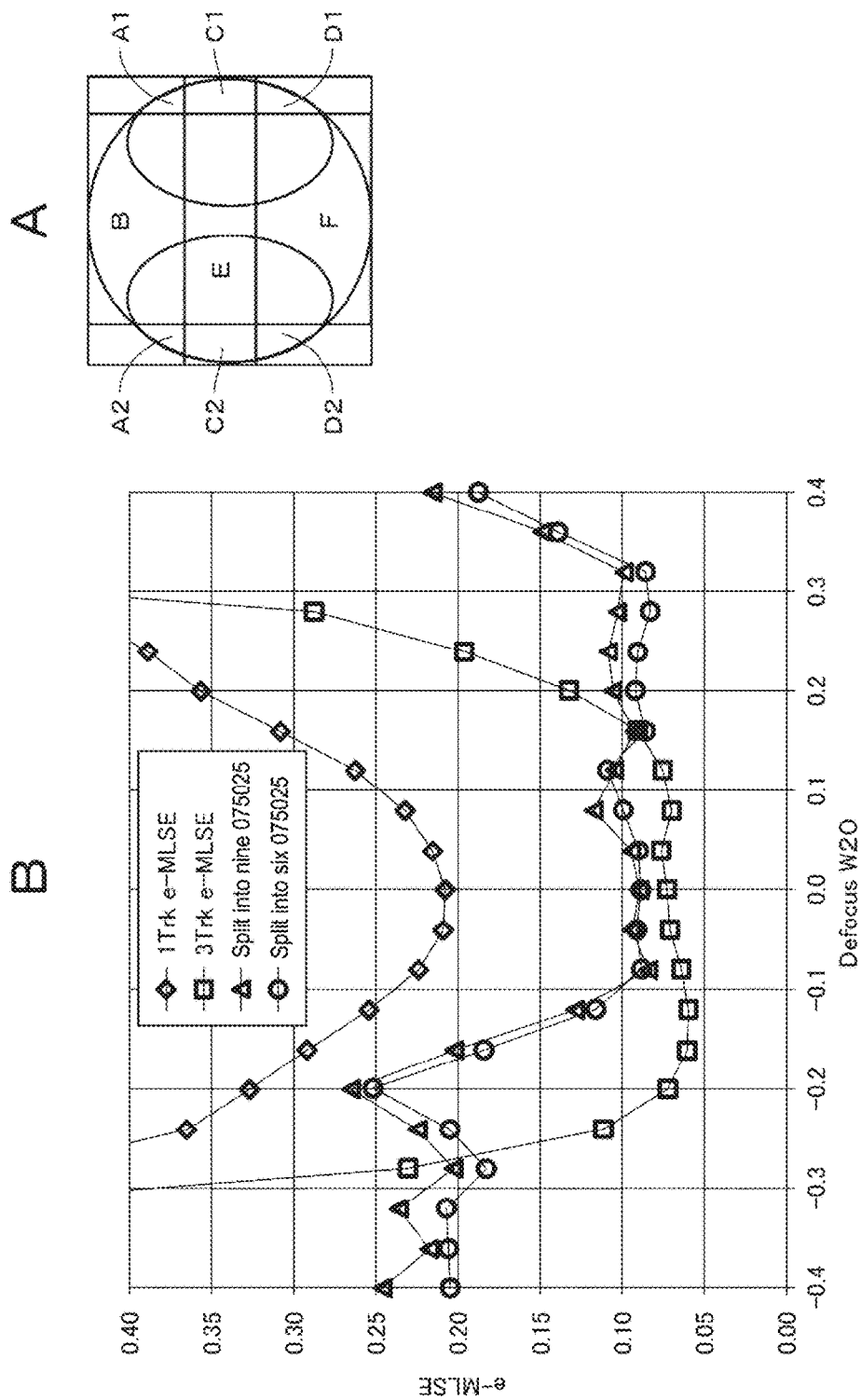
FIG. 18 A graph illustrating a seventh embodiment of region split, and showing a reproduction performance.

FIG. 18A shows a seventh embodiment method of region split, and FIG. 18B is a graph showing simulated results. As shown in FIG. 18A, two parallel lines extending in a radial direction split the beam into three in a tangential direction and two parallel lines extending in the tangential direction split the beam into three in the radial direction. As a result, nine regions are formed. When the number of the regions is great such as nine regions, a circuit magnitude becomes great and it becomes a disadvantage in terms of S/N.

As shown in FIG. 18A, respective outer two regions (A1, A2), (C1, C2) and (D1, D2) are considered as one region, whereby the number of split is substantially two in the radial direction. As a result, six regions A to F are formed.

The reproduction performance is simulated for the respective split patterns shown in FIG. 17A and FIG. 18A. For a comparison purpose, there are used reproduction with no adaptive processing by the adaptive equalizer unit (1Trk e-MLSE) and reproduction using a three track reproduction information signal (3Trk e-MLSE).

In the graph of FIG. 18B, "split into six 075025" represents a region split position in FIG. 18A: at a position of ±0.75 in a radial direction and ±0.25 in a tangential direction when a diameter is set to 1. As shown in the graph (defocus amount normalized vs index) of FIG. 18B, by the method of splitting the beam into six, the properties substantially similar to the method of splitting the beam into nine can be provided.

[Patterns of Region Split]

Figure 19:
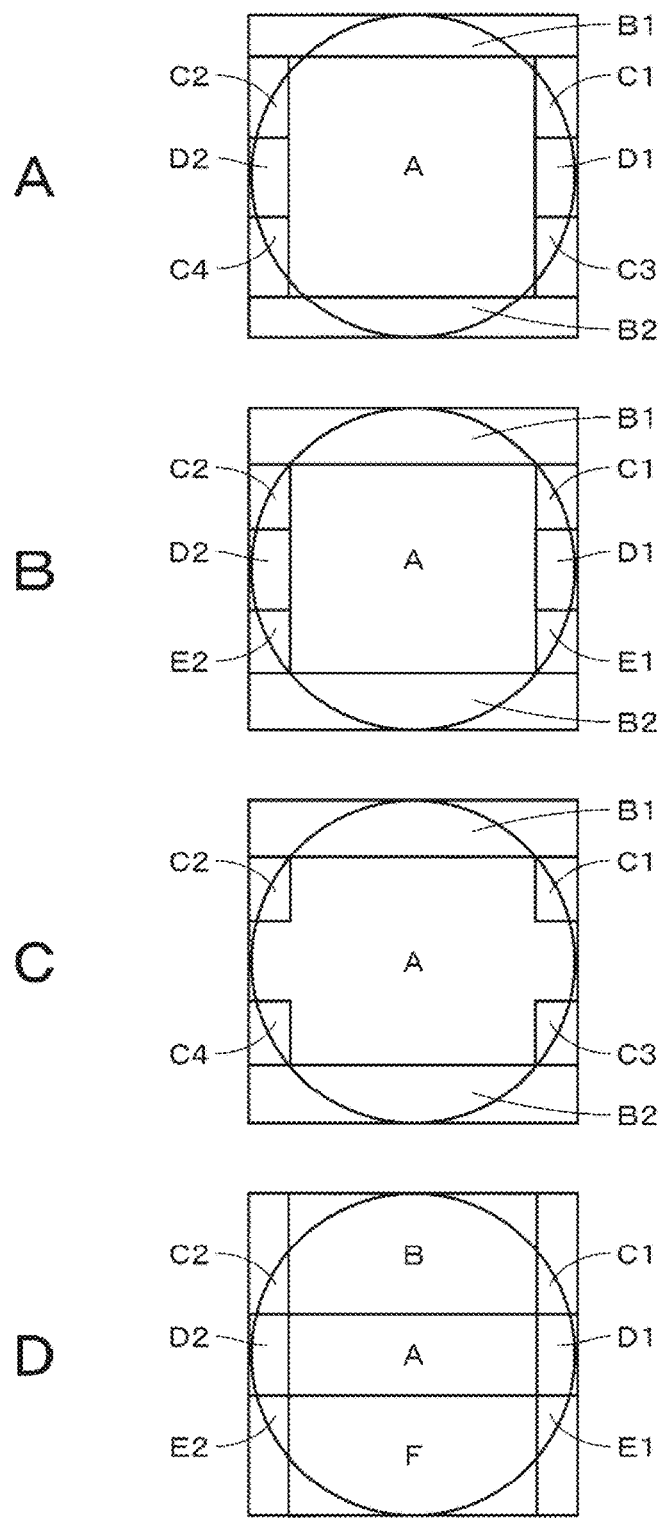
FIG. 19 A schematic diagram showing a plurality patterns of region split.

FIG. 19 shows other embodiments of the region split by considering outer two regions as one region to decrease the number of regions, as shown in FIG. 18A. A shown in FIG. 19A, respective outer two regions (C1, C2, C3, C4), (D1, D2) and (E1, E2) are considered as one region, and respective lower and upper two regions (B1, B2) are considered as one region. As a result, four regions are formed.

FIG. 19B is an embodiment that the regions (C3, C4) in FIG. 19A are changed to other regions (E1, E2), thereby forming five regions. FIG. 19C is an embodiment that performs the region split into three: A, (B1, B2) and (C1 to C4). FIG. 19D is an embodiment that forms six regions: A, B, (C1, C2), (D1, D2), (E1, E2) and F.

Figure 20:
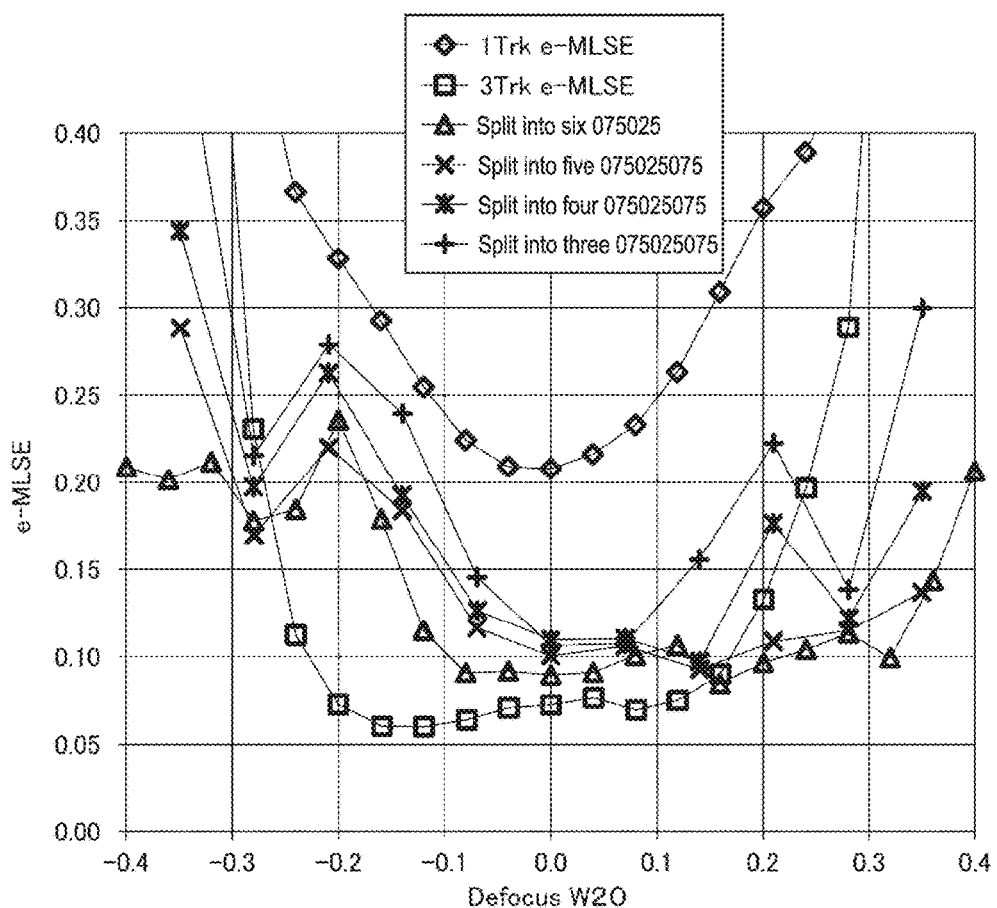
FIG. 20 A graph showing a reproduction performance of a plurality patterns of region split.

FIG. 20 is a graph showing the simulated results corresponding to the respective split methods shown in FIG. 19A to FIG. 19D. For a comparison purpose, there are used reproduction with no adaptive processing by the adaptive equalizer unit (1Trk e-MLSE) and reproduction using a three track reproduction information signal (3Trk e-MLSE). In the graph, "split into three 075025075", "split into four 075025075", "split into five 075025075" and "split into six 075025" represent region split positions in FIG. 19A, FIG. 19B and FIG. 19C: at a position of ±0.75 in a radial direction and ±0.25 and ±0.75 in a tangential direction when a diameter is set to 1, and represent a region split position in FIG. 19D: at a position of ±0.75 in a radial direction and ±0.25 in a tangential direction when a diameter is set to 1.

As shown in the graph (defocus amount normalized vs index) of FIG. 20, by the method of splitting the beam into five, the properties substantially similar to the method of splitting the beam into six can be provided.

Heretofore, the improvement effect by narrowing the track pitch mainly according to the present disclosure has been described. However, the present disclosure is not limited thereto. A significant effect can be provided when a channel bit length, i.e., a mark length, is lengthened to densify in a line density direction, thereby densifying an optical disc.

Figure 21:
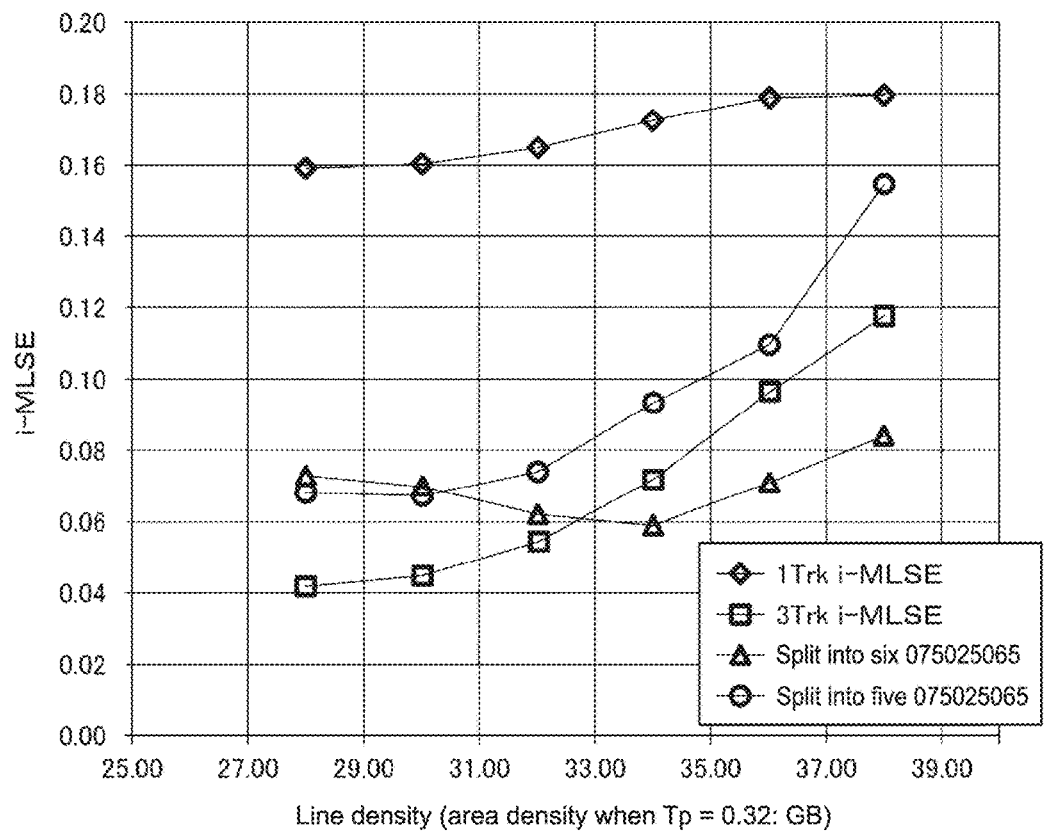
FIG. 21 A graph showing a reproduction performance when a line density is changed.
Figure 22:
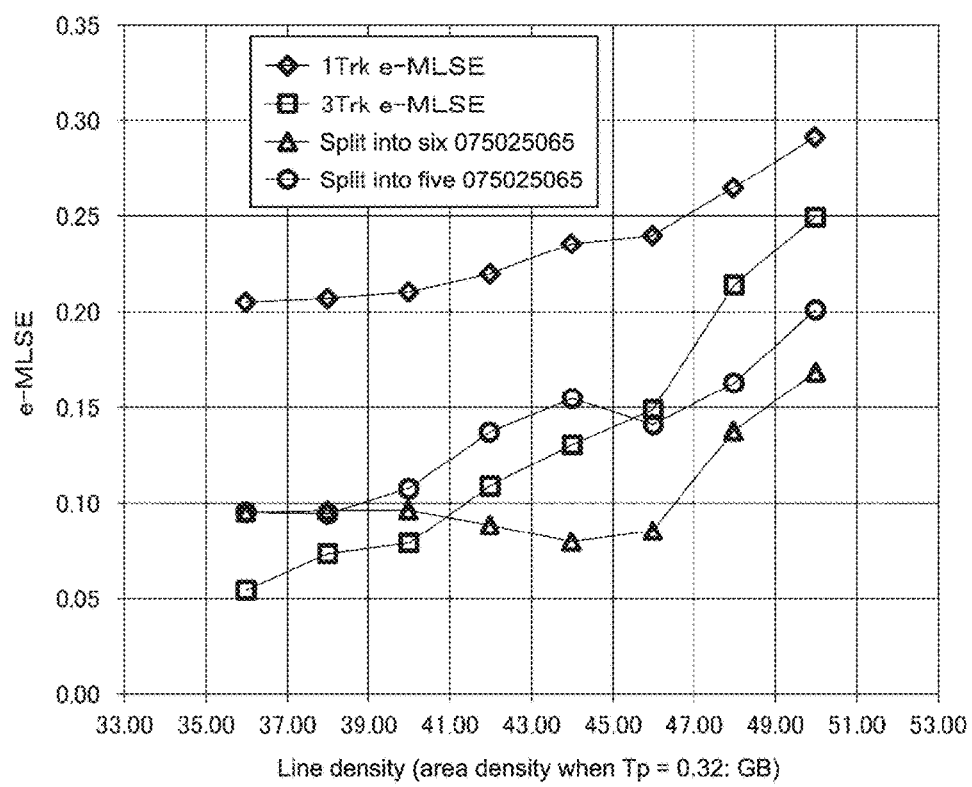
FIG. 22 A graph showing a reproduction performance when a line density is changed.

For easy comparison with the BD™ and BDXL™ in the related art, the NA is fixed to 0.85 corresponding to the BD™ and BDXL™, and the track pitch is also fixed to 0.225 µm (for each of the groove and the land) different from the above-described embodiments. Under the state, the channel bit length is changed, and the line density is changed. FIG. 21 shows results that PR (1, 2, 2, 2, 1) is used for 1 Trk, 3Trk computation, the split into five (split in the tangential direction is just internal and external), the split into six (into 3 in the Tan direction), and the index is i-MLSE. FIG. 22 shows results that PR (1, 2, 3, 3, 3, 2, 1) is used and the index is e-M1SE.

In the graph, "split into five 075025065" and "split into six 075025065" represent region split positions in the Figures: at a position of ±0.75 in a radial direction and ±0.25 and ±0.65 in a tangential direction when a diameter is set to 1. A horizontal axis represents the line density by converting the line density into an area density when the track pitch is set to 0.32 µm same as the BD™.

As shown in FIG. 21, in the case of the "split into six 075025065", the signal can be reproduced to the higher line density with less property degradation as compared with the (3Trk i-MLSE). In the case of the "split into five 075025065", i.e., the split in the tangential direction just internal and external, a tendency similar to the (3Trk i-MLSE) is shown. It shows that the advantage of the high line density is due to that the regions having different centers are split in the tangential direction. In addition, as shown in FIG. 22, the same advantage is provided for a high class PR having a higher line density.

The present disclosure may have the following configurations.

(1) An optical medium reproduction apparatus for optically reproducing an optical medium where a plurality of tracks are formed, including:

a detection unit for splitting a cross section of a beam returned from the optical medium into a plurality of regions and for forming respective detection signals of a plurality of the regions;

a multiple input adaptive equalizer having a plurality of adaptive equalizer units, in which the respective detection signals of a plurality of the regions are inputted into the plurality of adaptive equalizer units, and the outputs of the plurality of adaptive equalizer units are computed to from equalization signals;

a binarization unit for binarizing the equalization signals to provide binary data; and an equalization error computing unit for determining an equalization error from equalization target signals provided based on the binary data from the binarization unit and the equalization signals outputted from the multiple input adaptive equalizer, and providing the adaptive equalizer units with the equalization error as control signals for adaptive equalization.

(2) The optical medium reproduction apparatus according to (1) above, in which the multiple input adaptive equalizer performs partial response equalization processing on the respective detection signals of a plurality of the regions, the binarization unit performs maximum likelihood decoding processing as binarization processing for the equalization signals of the multiple input adaptive equalizer, and the equalization error computing unit determines an equalization error from computation using equalization target signals provided by convolution processing of the binary data of the maximum likelihood decoding and the equalization signals outputted from the multiple input adaptive equalizer.

(3) The optical medium reproduction apparatus according to any one of (1) and (2) above, in which the detection unit includes a detector split corresponding to a plurality of the regions, and the detection signals of a plurality of the regions are taken out from the detector.

(4) The optical medium reproduction apparatus according to any one of (1) and (2) above, in which the beam returns back to the detection unit from the optical medium through an objective lens, in which the beam returns back to the detection unit from the optical medium through an objective lens, in which an optical path conversion element is arranged for splitting a plurality of the regions in an optical path passing through the objective lens to the detection unit.

(5) The optical medium reproduction apparatus according to any one of (1) though (4) above, in which the beam is split into three or more in a cross section direction.

(6) The optical medium reproduction apparatus according to any one of (1) though (5) above, in which lands and grooves are formed alternated on the optical medium, and information is recorded on both of the lands and the grooves.

(7) A method of reproducing an optical medium for optically reproducing an optical medium where a plurality of tracks are formed, including:

splitting a cross section of a beam returned from the optical medium into a plurality of regions;

forming respective detection signals of a plurality of the regions by a detection unit;

inputting the respective detection signals of a plurality of the regions to a plurality of adaptive equalizer units;

computing outputs of a plurality of adaptive equalizer units to form equalization signals;

binarizing the equalization signals to provide binary data; and determining an equalization error from equalization target signals provided based on the binary data from the binarization process and the equalization signals; and providing the adaptive equalizer units with the equalization error as control signals for adaptive equalization.

<2. Alternative Embodiment>

While the present disclosure is described herein with reference to illustrative embodiments for particular applications, it should be understood that the present disclosure is not limited to the above-describe embodiments. A variety of alternations may be possible based on the technical spirits of the present disclosure. For example, the above-described numerical values of the light source wavelength, the track pitch, and recording line density are illustrative, and other numerical values may be used. The index for evaluating the reproduction performance other than that described above may be used. In addition, the present disclosure may be applicable to an optical disc apparatus for performing either recording or reproducing on an optical disc.

The configuration, the method, the process, the shape, the material, and the numerical values in the above-descried embodiments may be combined each other without departing from the spirit of the present disclosure.

DESCRIPTION OF REFERENCE NUMERALS 13 multiple input adaptive equalizer unit
14 binarization detection unit
15 PR convolution device
21 to 23 adaptive equalizer unit
100 optical disc
101 optical pickup
105 data detection processing unit

The invention claimed is:

1. An optical medium reproduction apparatus for optically reproducing an optical medium where a plurality of tracks are formed, comprising:

a detection unit for splitting a cross section of a beam, after the beam is irradiated onto the optical medium and is returned to the detection unit from the optical medium, into a plurality of regions in a tangential direction, wherein the returned beam includes mixed information of three tracks which is reproduced simultaneously by one beam, and for forming respective detection signals of the plurality of the regions; and a data detection processing unit configured to process the respective detection signals obtained by splitting the beam and input from the detection unit, to provide binary data in which adjacent track cross talk is cancelled using only an output read from a track to be reproduced, the data detection processing unit comprising:

a multiple input adaptive equalizer having a plurality of adaptive equalizer units, wherein the respective detection signals of the plurality of the regions are inputted into the plurality of adaptive equalizer units, and the outputs of the plurality of adaptive equalizer units are computed to form equalization signals;

a binarization unit for binarizing the equalization signals to provide the binary data in which adjacent track cross talk is cancelled; and an equalization error computing unit for determining an equalization error from equalization target signals provided based on the binary data from the binarization unit and the equalization signals outputted from the multiple input adaptive equalizer, and providing the adaptive equalizer units with the equalization error as control signals for adaptive equalization, the plurality of the regions formed by splitting being four or more.

2. The optical medium reproduction apparatus according to claim 1, wherein the multiple input adaptive equalizer performs partial response equalization processing on the respective detection signals of a plurality of the regions, the binarization unit performs maximum likelihood decoding processing as binarization processing for the equalization signals of the multiple input adaptive equalizer, and the equalization error computing unit determines an equalization error from computation using equalization target signals provided by convolution processing of the binary data of the maximum likelihood decoding and the equalization signals outputted from the multiple input adaptive equalizer.

3. The optical medium reproduction apparatus according to claim 1, wherein the detection unit includes a detector split corresponding to a plurality of the regions, and the detection signals of a plurality of the regions are taken out from the detector.

4. The optical medium reproduction apparatus according to claim 1, wherein
the beam returns back to the detection unit from the optical medium through an objective lens, wherein an optical path conversion element is arranged for splitting a plurality of the regions in an optical path passing through the objective lens to the detection unit.

5. The optical medium reproduction apparatus according to claim 1, wherein
lands and grooves are formed alternated on the optical medium, and
information is recorded on both of the lands and the grooves.

6. A method for optically reproducing an optical medium where a plurality of tracks are formed, comprising:
splitting a cross section of a beam, after the beam is irradiated onto the optical medium and is returned to a detection unit from the optical medium, into a plurality of regions in a tangential direction, wherein the returned beam includes mixed information of three tracks which is reproduced simultaneously by one beam;
forming respective detection signals of the plurality of the regions by the detection unit; and
processing the respective detection signals, obtained by splitting the beam and input from the detection unit, to provide binary data in which adjacent track cross talk is cancelled using only an output read from a track to be reproduced, the processing comprising:
inputting the respective detection signals of the plurality of the regions to a plurality of adaptive equalizer units;
computing outputs of the plurality of adaptive equalizer units to form equalization signals;
binarizing the equalization signals to provide the binary data in which adjacent track cross talk is cancelled;
determining an equalization error from equalization target signals provided based on the binary data from the binarization process and the equalization signals; and
providing the adaptive equalizer units with the equalization error as control signals for adaptive equalization,
the plurality of the regions formed by splitting being four or more.

7. The optical medium reproduction apparatus according to claim 1, wherein outer two regions in the plurality of regions are considered as one region.

* * * * *